US012757104B2

(12) United States Patent
Faccin et al.

(10) Patent No.: US 12,757,104 B2
(45) Date of Patent: Oct. 6, 2026

(54) AERIAL USER EQUIPMENT (UE) POLICY CONFIGURATION BASED ON AERIAL FLIGHT ZONES

(71) Applicant: QUALCOMM Incorporated, San Diego, CA (US)

(72) Inventors: Stefano Faccin, San Ysidro, CA (US); Umesh Phuyal, San Diego, CA (US); Le Liu, San Jose, CA (US); Drew Foster Van Duren, Templeton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 570 days.

(21) Appl. No.: 18/305,259

(22) Filed: Apr. 21, 2023

(65) Prior Publication Data

US 2024/0357474 A1 Oct. 24, 2024

(51) Int. Cl.
*H04W 48/08* (2009.01)
*H04B 7/185* (2006.01)

(52) U.S. Cl.
CPC ........ *H04W 48/08* (2013.01); *H04B 7/18504* (2013.01)

(58) Field of Classification Search
CPC ................................ C11B 9/022; H04W 48/08
USPC ........................................................... 455/431
See application file for complete search history.

(56) References Cited

U.S. PATENT DOCUMENTS

2012/0188878 A1* 7/2012 Simon ..................... H04W 4/06 370/312
2016/0292696 A1 10/2016 Gong et al.
2018/0033317 A1* 2/2018 Lau .......................... G08G 5/55
2021/0144626 A1* 5/2021 Han ....................... H04W 48/04
2021/0165426 A1* 6/2021 White .................... G05D 1/101
2022/0286866 A1 9/2022 Liu et al.
2022/0417865 A1* 12/2022 Venkatasubramanian .................. B64U 10/00
2023/0077297 A1* 3/2023 Fu ........................... H04W 4/40
2023/0379856 A1* 11/2023 Ryu ...................... H04W 12/72
(Continued)

OTHER PUBLICATIONS

Huawei, et al., "Initial Discussion on Additional OOBE Requirements for Aerial UEs", 3GPP TSG-RAN WG4 Meeting #106bis-e, R4-2305712, 3rd Generation Partnership Project, Mobile Competence Centre, 650, Route Des Lucioles, F-06921, Sophia-Antipolis Cedex, France, vol. RAN WG4, No. Online, Apr. 17, 2023-Apr. 26, 2023, Apr. 10, 2023, XP052403023, 7 Pages.
(Continued)

*Primary Examiner* — Fabricio R Murillo Garcia
(74) *Attorney, Agent, or Firm* — Polsinelli LLP

(57) ABSTRACT

Systems and techniques are provided for wireless communications. For instance, a network entity can transmit, to an aerial user equipment (UE), policy information associated with a communication interface of a wireless network. The policy information can include a respective policy corresponding to each aerial zone identifier of a plurality of aerial zone identifiers. The network entity can determine a mapping of a plurality of aerial zones to one or more cells of the wireless network, wherein the mapping is indicative of one or more aerial zone identifiers associated with each respective cell of the one or more cells. The network entity can transmit, based on the mapping, at least one aerial zone identifier associated with a first cell of the one or more cells.

30 Claims, 11 Drawing Sheets

(56) References Cited

U.S. PATENT DOCUMENTS

| | | | | |
|---|---|---|---|---|
| 2024/0298194 | A1* | 9/2024 | Mueck | G06N 20/00 |
| 2024/0413858 | A1* | 12/2024 | Mcmenamy | H04W 24/10 |

OTHER PUBLICATIONS

International Search Report and Written Opinion—PCT/US2024/020603—ISA/EPO—Jul. 24, 2024.

* cited by examiner

AERIAL USER EQUIPMENT (UE) POLICY CONFIGURATION BASED ON AERIAL FLIGHT ZONES

FIELD OF THE DISCLOSURE

Aspects of the present disclosure generally relate to wireless communication. In some implementations, examples are described for performing wireless communications using differentiated aerial user equipment (UE) behavior based on aerial flight zones.

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

Air-to-ground (ATG) communications systems are deployed to provide various telecommunication services associated with aircrafts and/or other aerial user equipment (UEs). Aerial UEs can include unmanned aerial vehicles (UAVs) and/or unmanned aircraft systems (UASs). ATG communications systems can be implemented to interface with terrestrial wireless communications systems by positioning terrestrial antennas (e.g., at a base station) in a manner that can communicate with aerial UE antennas while the aerial UE is in flight. In some cases, ATG communications can be used to provide in-flight communication services for airborne devices. In addition, ATG communications can be used to provide aerial UE operations communications (e.g., aerial UE maintenance, flight planning, weather, etc.) as well as air traffic control information.

SUMMARY

Air-to-ground (ATG) communications can be used to provide connectivity between terrestrial wireless communication networks and aerial user equipment (UE), which may include aircrafts, unmanned aerial vehicles (UAVs), unmanned aircraft systems (UASs), among various others. In some cases, cellular networks may be used to provide coverage to aerial UEs for various services. For instance, cellular networks can provide coverage to aerial UEs for control and non-payload communication (CNPC) communications. CNPC communications can include command and control information, telemetry information, etc. Cellular networks can additionally provide coverage to aerial UEs for PC5-based services. PC5-based services can be associated with device-to-device communications (e.g., sidelink communications). In some cases, PC5-based services can include broadcast remote ID and/or detect and avoid (DAA) using PC5 sidelink. Cellular networks can be used to provide PC5-based services in mobile network operator (MNO)-managed spectrum and/or in non-MNO-managed spectrum.

Aerial UE policy configuration can be performed based at least in part on aviation regulations in various countries or regions where aerial UEs operate. For instance, aerial UEs may be required to utilize connectivity services and/or flight services in different ways based on the geographical location where the aerial UE is operating. For instance, aviation regulations may require aerial UEs to broadcast detect and avoid (DAA) messages with a greater transmit power and/or a shorter interval when operating over urban areas, crowded airspace, at low altitudes, etc. In some cases, aerial UEs may be required to avoid certain geographical locations or regions for a temporary amount of time (e.g., due to airspace closures over sporting or stadium events, etc.). There is a need to configure or otherwise provide aerial UEs with awareness of aerial zone information that is indicative of a connectivity service(s) policy, a flight service(s) policy, or other location-specific regulatory restrictions or requirements.

In some examples, aerial UEs can be configured with policy information that provides a mapping between different geographical locations and corresponding policy information for each geographical location. Configuring individual aerial UEs with location-based policy information for using various user communication interfaces provides a distributed approach to policy distribution and management. In a distributed approach, it can be difficult to update or maintain the policy information to remain current with applicable aerial flight zones and corresponding policies. There is a need for systems and techniques that can be used to perform policy configuration for differentiated aerial UE behavior over a plurality of aerial flight zones.

In some aspects, systems and techniques are described herein for performing wireless communication. For example, the systems and techniques can be used to perform aerial UE policy configuration and/or management for differentiated aerial UE behavior over a plurality of aerial flight zones. In some cases, a network entity (e.g., associated with a cellular network) can transmit policy information to one or more aerial UEs. The policy information can correspond to a communication interface of the cellular network, such as a PC5 interface. The policy information can include a plurality of policies, where each respective policy corresponds to a particular aerial zone identifier. An aerial zone identifier can be indicative of a type of aerial zone. Different types of aerial zones (e.g., different aerial zone identifiers) can be used to implement one or more corresponding policies for communications performed by an aerial UE within an aerial zone. The network entity can map a set of aerial zones to one or more corresponding cells of the cellular network. For instance, a first aerial zone can be mapped to a first subset of cells, a second aerial zone can be mapped to a second subset of cells, etc. The mapping can associate some (or all) of the cells of the cellular network to a corresponding aerial zone. One or more aerial zone identifiers of each aerial zone can be mapped to (e.g., associated with) each cell of the particular subset of cells that correspond to the aerial zone. Each cell can broadcast the corresponding aerial zone identifiers determined by the mapping. For instance, cells can broadcast the one or more corresponding aerial zone identifiers (e.g., aerial zone types) in a system information broadcast (SIB) message or a Radio Resource Control (RRC) message, among various others. Based on receiving the SIB message or other broadcast message indicative of the aerial zone identifier(s) for a particular cell, an aerial UE can determine and apply a corresponding policy for communication within the particular cell.

According to at least one illustrative example, an apparatus of a network entity for wireless communications is provided that includes a memory (e.g., configured to store data, such as audio data, etc.) and one or more processors (e.g., implemented in circuitry) coupled to the memory. The one or more processors are configured to and can: transmit, to an aerial user equipment (UE), policy information associated with a communication interface of a wireless network, wherein the policy information includes a respective policy corresponding to each aerial zone identifier of a plurality of aerial zone identifiers; determine a mapping of a plurality of aerial zones to one or more cells of the wireless network, wherein the mapping is indicative of one or more aerial zone identifiers associated with each respective cell of the one or more cells; and transmit, based on the mapping, at least one aerial zone identifier associated with a first cell of the one or more cells.

In another example, a method of wireless communications at a network entity is provided, the method comprising: transmitting, to an aerial user equipment (UE), policy information associated with a communication interface of a wireless network, wherein the policy information includes a respective policy corresponding to each aerial zone identifier of a plurality of aerial zone identifiers; determining a mapping of a plurality of aerial zones to one or more cells of the wireless network, wherein the mapping is indicative of one or more aerial zone identifiers associated with each respective cell of the one or more cells; and transmitting, based on the mapping, at least one aerial zone identifier associated with a first cell of the one or more cells.

In another example, a non-transitory computer-readable medium is provided that has stored thereon instructions that, when executed by one or more processors, cause the one or more processors to: transmit, to an aerial user equipment (UE), policy information associated with a communication interface of a wireless network, wherein the policy information includes a respective policy corresponding to each aerial zone identifier of a plurality of aerial zone identifiers; determine a mapping of a plurality of aerial zones to one or more cells of the wireless network, wherein the mapping is indicative of one or more aerial zone identifiers associated with each respective cell of the one or more cells; and transmit, based on the mapping, at least one aerial zone identifier associated with a first cell of the one or more cells.

In another example, an apparatus for wireless communications at a network entity is provided. The apparatus includes: means for transmitting, to an aerial user equipment (UE), policy information associated with a communication interface of a wireless network, wherein the policy information includes a respective policy corresponding to each aerial zone identifier of a plurality of aerial zone identifiers; means for determining a mapping of a plurality of aerial zones to one or more cells of the wireless network, wherein the mapping is indicative of one or more aerial zone identifiers associated with each respective cell of the one or more cells; and means for transmitting, based on the mapping, at least one aerial zone identifier associated with a first cell of the one or more cells.

In another illustrative example, an apparatus of an aerial user equipment (UE) for wireless communications is provided that includes a memory (e.g., configured to store data, such as audio data, etc.) and one or more processors (e.g., implemented in circuitry) coupled to the memory. The one or more processors are configured to and can: receive, from a network entity, policy information associated with a communication interface of a wireless network, wherein the policy information includes a respective policy corresponding to each aerial zone identifier of a plurality of aerial zone identifiers; receive, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells; and transmit a radio frequency (RF) signal based on the respective policy corresponding to the at least one aerial zone identifier associated with the first cell.

In another example, a method of wireless communications at a network entity is provided, the method comprising: receiving, from a network entity, policy information associated with a communication interface of a wireless network, wherein the policy information includes a respective policy corresponding to each aerial zone identifier of a plurality of aerial zone identifiers; receiving, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells; and transmitting a radio frequency (RF) signal based on the respective policy corresponding to the at least one aerial zone identifier associated with the first cell.

In another example, a non-transitory computer-readable medium is provided that has stored thereon instructions that, when executed by one or more processors, cause the one or more processors to: receive, from a network entity, policy information associated with a communication interface of a wireless network, wherein the policy information includes a respective policy corresponding to each aerial zone identifier of a plurality of aerial zone identifiers; receive, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells; and transmit a radio frequency (RF) signal based on the respective policy corresponding to the at least one aerial zone identifier associated with the first cell.

In another example, an apparatus for wireless communications at a network entity is provided. The apparatus includes: means for receiving, from a network entity, policy information associated with a communication interface of a wireless network, wherein the policy information includes a respective policy corresponding to each aerial zone identifier of a plurality of aerial zone identifiers; means for receiving, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells; and means for transmitting a radio frequency (RF) signal based on the respective policy corresponding to the at least one aerial zone identifier associated with the first cell.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
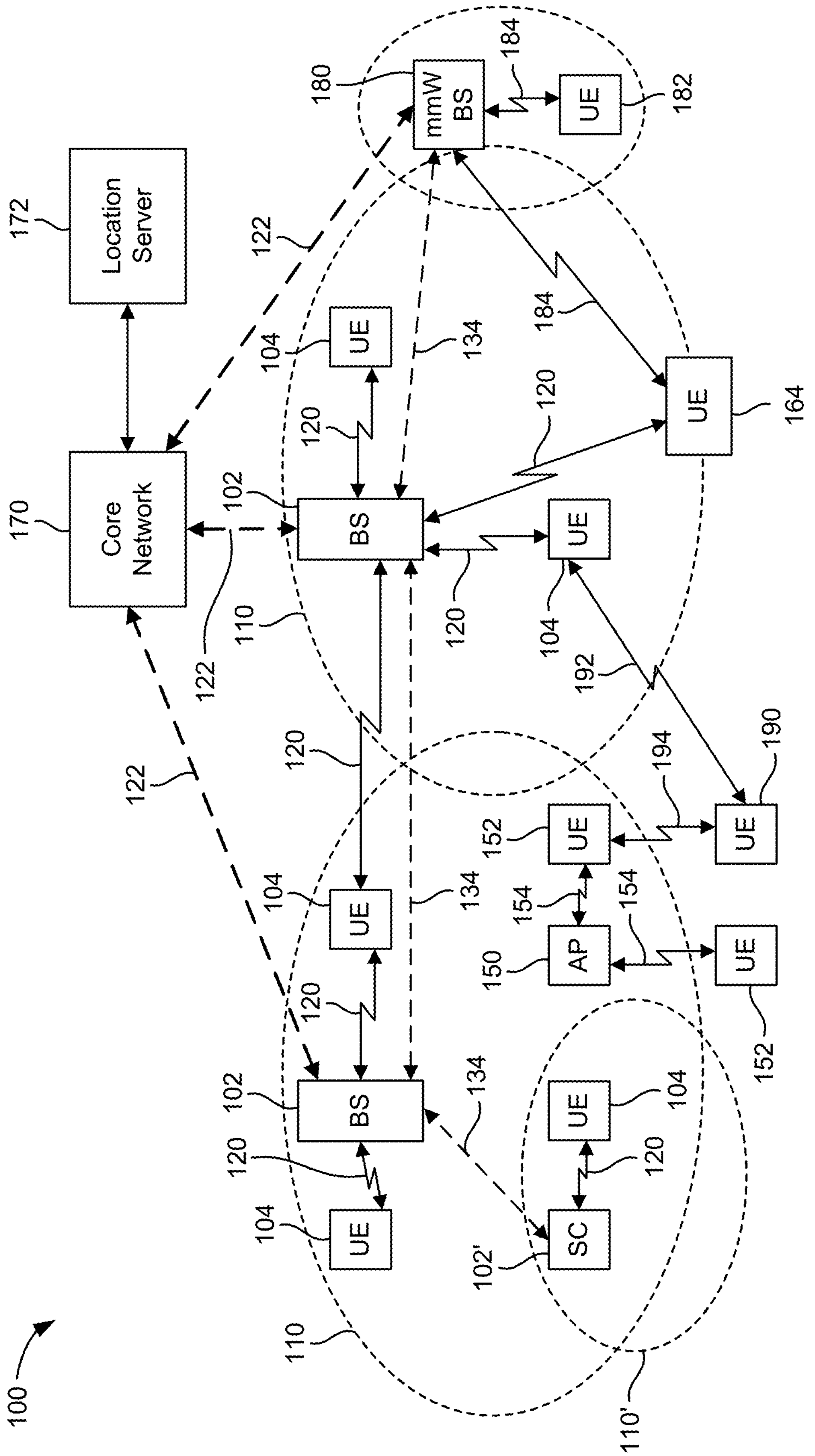
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

In some cases, a client device may be outside of the coverage area associated with a wireless communication network. For example, a client device may be located in a geographical area that is outside the range of the nearest base station or in a geographical area with poor signal quality. In some examples, a client device that is outside of the coverage area associated with a wireless communication network can also be referred to as a "remote UE." In some cases, access to a wireless communication network may be possible by using satellite communications. However, communication with existing satellite systems (e.g., Iridium® satellites) may not be practical. For example, communication with existing satellite systems may require the use of specialized client devices that satisfy strict antenna and transmit power requirements. In some cases, use of such specialized client devices requires skillful human-assisted operation for antenna positioning in a manner that avoids interference. While the shortcomings of existing satellite systems may be addressed by 3GPP non-terrestrial networks (NTN), such networks are associated with very high deployment costs (e.g., launching of new satellites), which may delay or hinder implementation.

Air-to-ground (ATG) communications can be used to provide connectivity between terrestrial wireless communication networks and aircrafts (e.g., including aerial UEs, such as UAVs, UASs, etc.). As used herein, an aircraft can include any apparatus or device that is configured to or able to fly through the air, such as an airplane (e.g., commercial airplanes, private airplanes, turboprop aircrafts, piston aircrafts, jets, military aircrafts, etc.), an unmanned aerial vehicle (UAV) or drone, a helicopter, an airship (e.g., a blimp or other airship), a glider, or other apparatus or device that is configured to or able to fly. For example, ATG communications can be implemented by positioning an antenna on a base station in an upward direction (e.g., antenna up-tilting) to facilitate communication with an airborne aircraft having one or more antennas on the bottom and/or sides of the aircraft fuselage. ATG communications can be used to provide in-flight passenger communication services, airline operation communications, and air traffic control services, among others. Advantages of ATG communications over satellite communications can include lower cost, higher throughput, and lower latency.

In some examples, Air-to-ground (ATG) communications can be used to provide connectivity between terrestrial wireless communication networks and aerial user equipment (UE), which may include aircrafts, unmanned aerial vehicles (UAVs), unmanned aircraft systems (UASs), among various others. In some cases, cellular networks may be used to provide connectivity to aerial UEs for various services and/or various user communication interfaces. For instance, cellular networks can provide coverage to aerial UEs for control and non-payload communication (CNPC) communications. CNPC communications can include command and control information, telemetry information, etc. Cellular networks can additionally provide coverage to aerial UEs for PC5-based services. PC5-based services can be associated with device-to-device communications (e.g., sidelink communications). In some cases, PC5-based services can include broadcast remote ID and/or detect and avoid (DAA) using PC5 sidelink. Cellular networks can be used to provide PC5-based services in mobile network operator (MNO)-managed spectrum and/or in non-MNO-managed spectrum.

In the example of PC5-based services, aerial UEs may be configured with various policies corresponding to the use of PC5 resources (e.g., PC5 network resources used by the aerial UE). In some examples, aerial UEs can be configured with the various policies by a network entity associated with the cellular network and/or can be configured at the application layer. Aerial UE policies can be configured based on a specific spectrum, frequency range, frequency band, etc., utilized by the aerial UE and/or utilized by the cellular network (e.g., MNO-managed or non-MNO-managed). For instance, a first policy may apply for a first spectrum portion, a second policy may apply for a second spectrum portion, etc. Aerial UE policies may also be configured based on a particular region in which the aerial UE and/or the cellular network (or network entities thereof) are located. For instance, a first policy may apply for a first geographical region, a second policy may apply for a second geographical region, etc. In some examples, aerial UE policies may additionally be configured based on a particular application(s) running within a particular spectrum and/or a particular spectrum. In some cases, aerial UE policies may include a default policy that may be applied by one or more aerial UEs independently of a geographical area associated with each of the aerial UEs. For instance, the default policy can be applied by an aerial UE in examples where no specific geographical area may be identified by the aerial UE.

Aerial UE policy configuration can be performed based at least in part on aviation regulations in various countries or regions where aerial UEs operate. For instance, aerial UEs may be required to utilize connectivity services and/or flight services in different ways based on the geographical location where the aerial UE is operating. For instance, aviation regulations may require aerial UEs to broadcast detect and avoid (DAA) messages with a greater transmit power and/or a shorter interval and/or in specific spectrum and/or over multiple radio frequencies when operating over urban areas, crowded airspace, at low altitudes, within temporary or fixed windows of time, etc. In some cases, aerial UEs may be required to avoid certain geographical locations or regions for a temporary amount of time (e.g., due to airspace closures over sporting or stadium events, etc.), and/or to avoid transmission in certain geographical locations or regions. There is a need to configure or otherwise provide aerial UEs with awareness of aerial zone information that is indicative of a connectivity service(s) policy, a flight service(s) policy, or other location-specific regulatory restrictions or requirements.

Aerial UEs can be configured with policy information that provides a mapping between different geographical locations and corresponding policy information for each geographical location. Configuring individual aerial UEs with location-based policy information for using various user communication interfaces provides a distributed approach to policy distribution and management. For instance, aerial UEs may be configured with location-based aerial policy information individually, in small groups, etc. Aerial policy information can be based on a mapping between aerial flight zone locations (e.g., three-dimensional (3D) volumes above the terrestrial surface) and cell locations (e.g., approximately two-dimensional (2D) regions on or near the terrestrial surface). Aerial policy information can be further based on a mapping between aerial flight zone locations and aerial flight zone identifiers (e.g., the different types of aerial flight zone(s) associated to a particular aerial flight zone location). In some cases, aerial policy information can be mapped to aerial flight zone locations and/or aerial flight zone identifiers to avoid downloading and configuring Aerial UEs with detailed location maps for large regions. Aerial policy information can be further based on a mapping between different aerial flight zone identifiers and the corresponding policy that is configured in and implemented by an aerial UE for each aerial flight zone identifier.

Aerial policy information may change based on one or more of the aerial zone location-network cell location mapping, the aerial zone location-aerial zone identifiers mapping, and/or the aerial zone identifiers-aerial UE policy mapping being changed, updated, or otherwise modified. In a distributed approach to aerial UE policy configuration and management, it can be difficult to update or maintain the policy information to remain current with applicable aerial flight zones and corresponding policies, as one or more (or all) of the mappings described above may change on a frequent basis. A distributed approach to aerial UE policy configuration and management may additionally be difficult to scale to larger quantities of aerial UEs operating within a cellular network with different aerial flight zones and/or aerial flight zone restrictions and policy implementations. There is a need for systems and techniques that can be used to perform policy configuration for differentiated aerial UE behavior over a plurality of aerial flight zones. There is a further need for systems and techniques that can be used to perform policy configuration and/or management for aerial UE behavior with reduced complexity of the application layer configuration and with reduced complexity of the sets of geographical data and policies that are applied in each respective geographical area.

Systems, apparatuses, processes (also referred to as methods), and computer-readable media (collectively referred to as "systems and techniques") are described herein for performing wireless communication. For example, the systems and techniques can be used to perform aerial UE policy configuration and/or management for differentiated aerial UE behavior over a plurality of aerial flight zones. In some cases, a network entity (e.g., associated with a cellular network) can transmit policy information to one or more aerial UEs. The policy information can correspond to a communication interface of the cellular network, such as a PC5 interface. The policy information can include a plurality of policies, where each respective policy corresponds to a particular aerial zone identifier. An aerial zone identifier can be indicative of a type of aerial zone. Different types of aerial zones (e.g., different aerial zone identifiers) can be used to implement one or more corresponding policies for communications performed by an aerial UE within an aerial zone. The network entity can map a set of aerial zones to one or more corresponding cells of the cellular network. For instance, a first aerial zone can be mapped to a first subset of cells, a second aerial zone can be mapped to a second subset of cells, etc. The mapping can associate some (or all) of the cells of the cellular network to a corresponding aerial zone. The mapping can associate some (or all) of the cells of the cellular network to one or more aerial zones, where each aerial zone applies to a specific set of aerial UEs configured with policy information that applies to the specific aerial zone. For example, the same cell may belong to a first and a second aerial zones, where the first aerial zone applies to a first set of aerial UEs, and the second aerial zone applies to a second set of aerial UEs, etc. One or more aerial zone identifiers of each aerial zone can be mapped to (e.g., associated with) each cell of the particular subset of cells that correspond to the aerial zone. Each cell can broadcast the corresponding aerial zones identifiers determined by the mapping. For instance, cells can broadcast the one or more corresponding aerial zone identifiers (e.g., aerial zone types) in a system information broadcast (SIB) message or a Radio Resource Control (RRC) message, among various others. Based on receiving the SIB message or other message indicative of the aerial zone identifier(s) for a particular cell, an aerial UE can determine and apply a corresponding policy for communication within the particular cell.

In some aspects, an aerial UE can be provided policy information indicative of one or more policies associated with the use of connectivity services of a cellular network. In some cases, the policy information can be associated with or indicative of a frequency of messages transmitted by the aerial UE using a particular radio technology and/or connectivity service of the cellular network and/or direct communication link between aerial UEs. For instance, the policy information can be indicative of a frequency of messages sent over PC5 for broadcast remote ID (BRID) messages, detect and avoid (DAA) messages, etc. The frequency of messages sent using the particular connectivity service (e.g., among various other aerial policies) can depend on the aerial flight zone in which the aerial UE is located. In some cases, the policy information can be associated with or indicative of a transmission power for messages transmitted by the aerial UE using a particular radio technology and/or connectivity service of the cellular network and/or a direct communication link between aerial UEs. For instance, the policy information can be indicative of a transmission power for messages sent over PC5 for a first service (e.g. broadcast remote ID (BRID) messages) and a second transmission power for messages sent over PC5 for a second service (e.g., detect and avoid (DAA) messages) etc. The transmission power of messages sent using the particular connectivity service (e.g., among various other aerial policies) can depend on the aerial flight zone in which the aerial UE is located. In some cases, the policy information can be associated with or indicative of a specific spectrum frequency for messages transmitted by the aerial UE using a particular radio technology and/or connectivity service of the cellular network and/or direct communication link between aerial UEs. For instance, the policy information can be indicative of a spectrum frequency power for messages sent over PC5 for a first service (e.g. (BRID) messages) and a second spectrum frequency for messages sent over PC5 for a second service (e.g., (DAA) messages), etc. The spectrum frequency of messages sent using the particular connectivity service (e.g., among various other aerial policies) can depend on the aerial flight zone in which the aerial UE is located. The policy information for the aerial UE (e.g., also referred to herein as aerial policy information) may be provided to the aerial UE at the application level of the cellular network and/or can be provided to the aerial UE as part of a set of policies provided to the aerial UE by a mobile network operator (MNO) or other mobile operator associated with the cellular network. For instance, the policy information can be provided to an aerial UE as part of one or more PC5 configuration policies.

In some aspects, an Unmanned Aircraft System (UAS) Traffic Management (UTM) network entity can provide aerial flight zone configuration information. For instance, the aerial flight zone configuration information can be indicative of a location of each aerial flight zone and can be indicative of one or more aerial flight zone identifiers (e.g., aerial flight zone types) associated to each aerial flight zone. In some examples, an application function (AF) included in an aviation domain (or other domain that includes the UTM) can provide an MNO with the aerial flight zone configuration information. For instance, the UTM (or UTM AF) can provide aerial flight zone configuration information via a Network Exposure Function (NEF) and/or UAS Network Function (NF) associated with or included in the cellular network. In some examples, the UTM (or UTM AF) can provide aerial flight zone configuration information via an interface to a Policy Control Function (PCF) or an Operations, Administration and Maintenance (OAM) function of the cellular network.

In some cases, aerial flight zone configuration information can provide a definition of the various aerial flight zones, for example in terms of geographical areas that can be mapped to the locations of a plurality of cells of the cellular network and identifiers (e.g., types) associated to the aerial flight zones. In some examples, the aerial flight zone configuration information can be dynamic, and for example may be based on conditions determined by the UTM. For instance, the UTM can provide aerial flight zone configuration information indicating that a first aerial flight zone will be labeled as zone type A during a first set of times and will be labeled as zone type B during a second set of times. In such examples, an aerial UE that is provided with different aerial policies for the zone type A and the zone type B will implement the corresponding different aerial policies within the first aerial flight zone depending on whether the current time is included in the first set of times or the second set of times.

In some examples, the cellular network (or network entity thereof) can map each aerial flight zone to one or more corresponding cells that are within the aerial flight zone. In some cases, the cellular network (or network entity thereof) can map each aerial flight zone to a system information broadcast (SIB) group or tracking area that includes multiple cells of a plurality of cells of the cellular network. In some examples, the PCF of the cellular network or the UAS NF (and/or the NEF) can map each aerial flight to the one or more corresponding cells within the aerial flight zone. The mapping information can be provided to the Application Management Function (AMF) of the cellular network, which may transmit the mapping information to the Radio Access Network (RAN) of the cellular network. From the RAN, the mapping information can be provided to one or more aerial UEs. For instance, each cell of the cellular network (e.g., each cell of the RAN) can broadcast (e.g., in a SIB or RRC message) information indicative of one or more aerial zone identifiers (e.g., aerial zone types) currently associated to the cell. Based on receiving the aerial zone identifier information for a particular cell, an aerial UE can determine and apply a corresponding policy for the received aerial zone identifier(s) for the particular cell.

Further aspects of the systems and techniques will be described with respect to the figures.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, unmanned aircraft system (UAS), helicopter, airship, glider, etc.) and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device.

Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc. utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
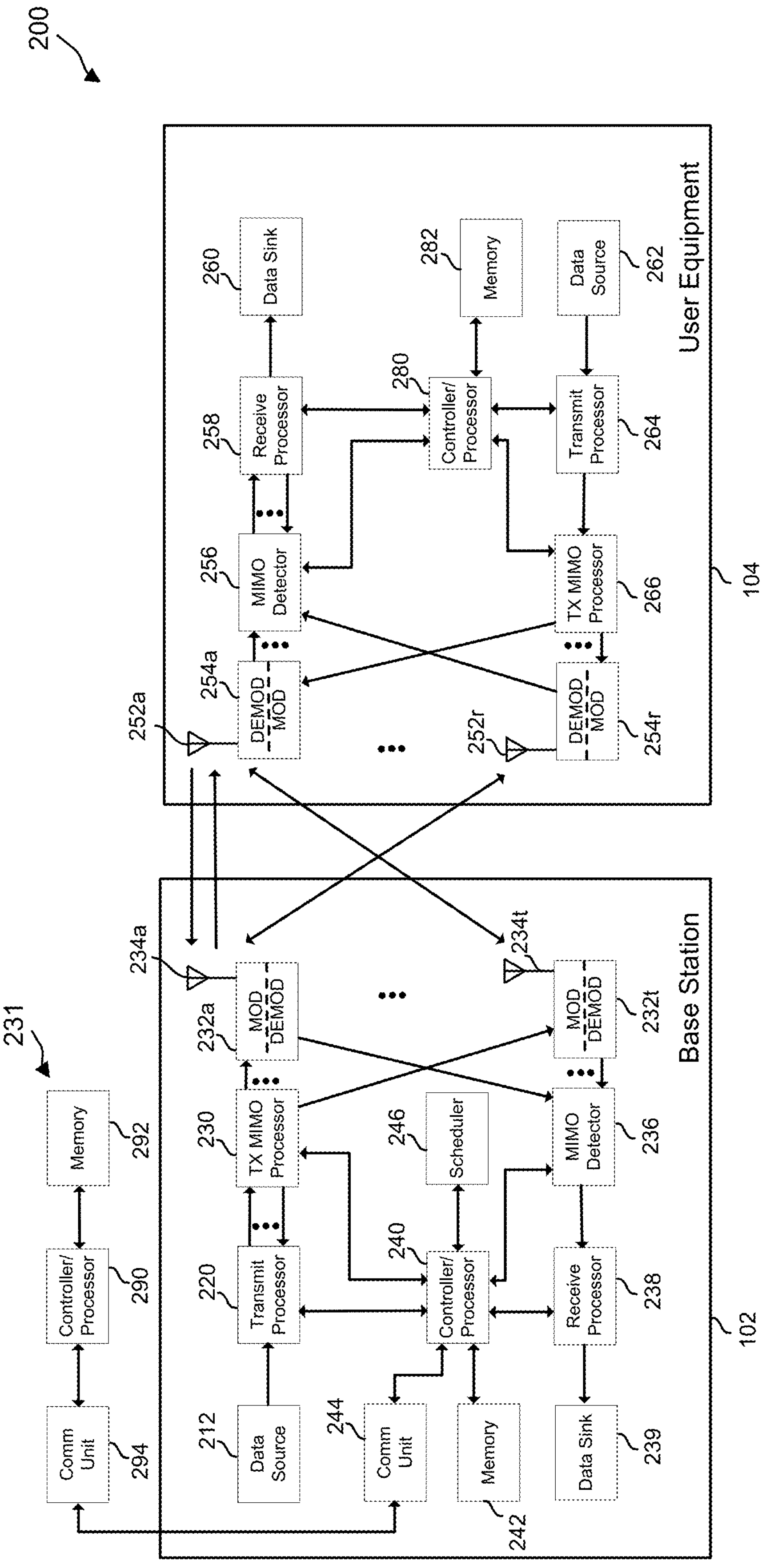
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234$a$ through 234$t$, and UE 104 may be equipped with R antennas 252$a$ through 252$r$, where in general $T \geq 1$ and $R \geq 1$.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
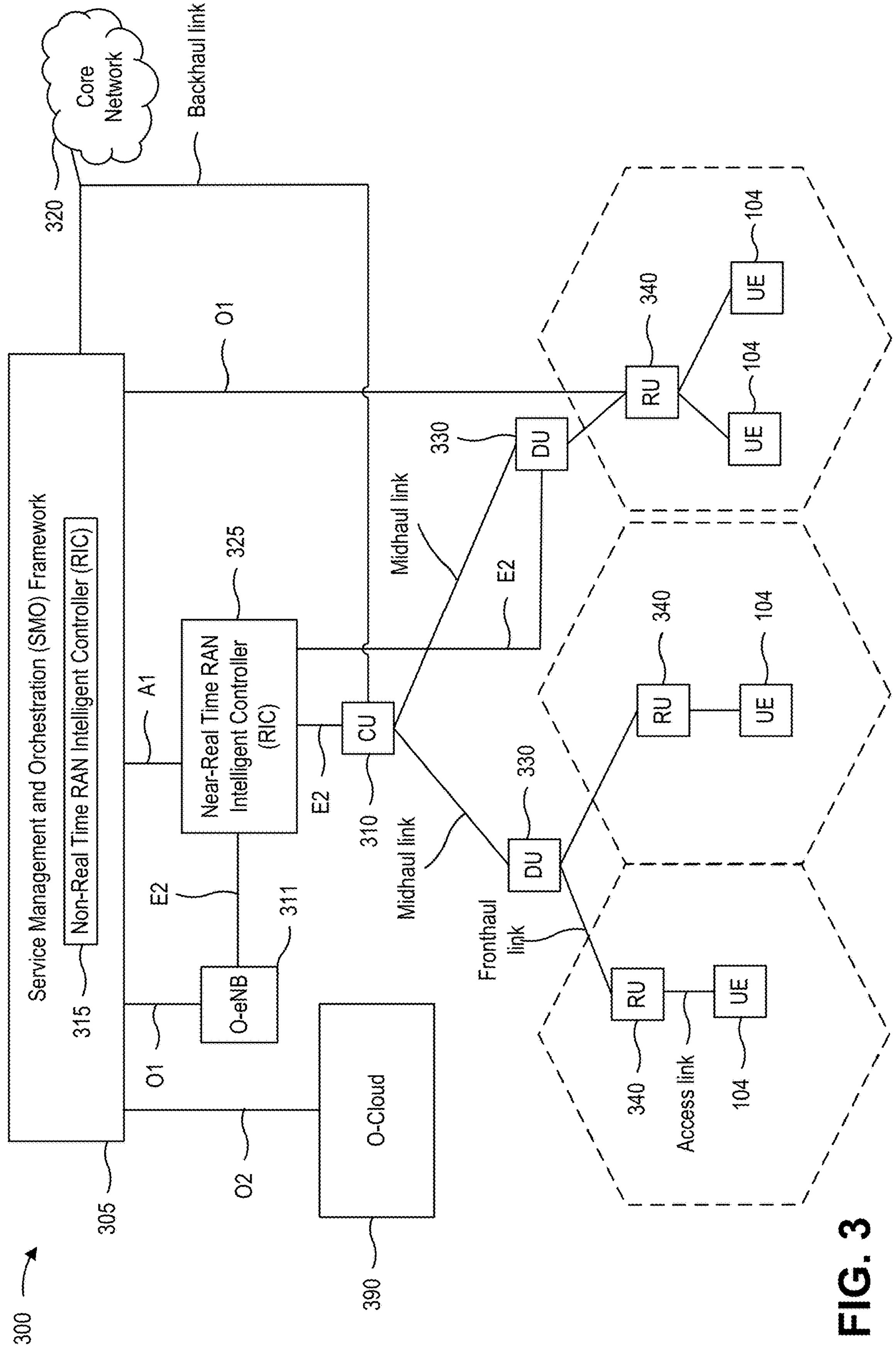
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUs 310, the DUs 330, the RUs 340, as well as the Near-RT RICs 325, the Non-RT RICs 315 and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via 01) or via creation of RAN management policies (e.g., such as A1 policies).

Figure 4:
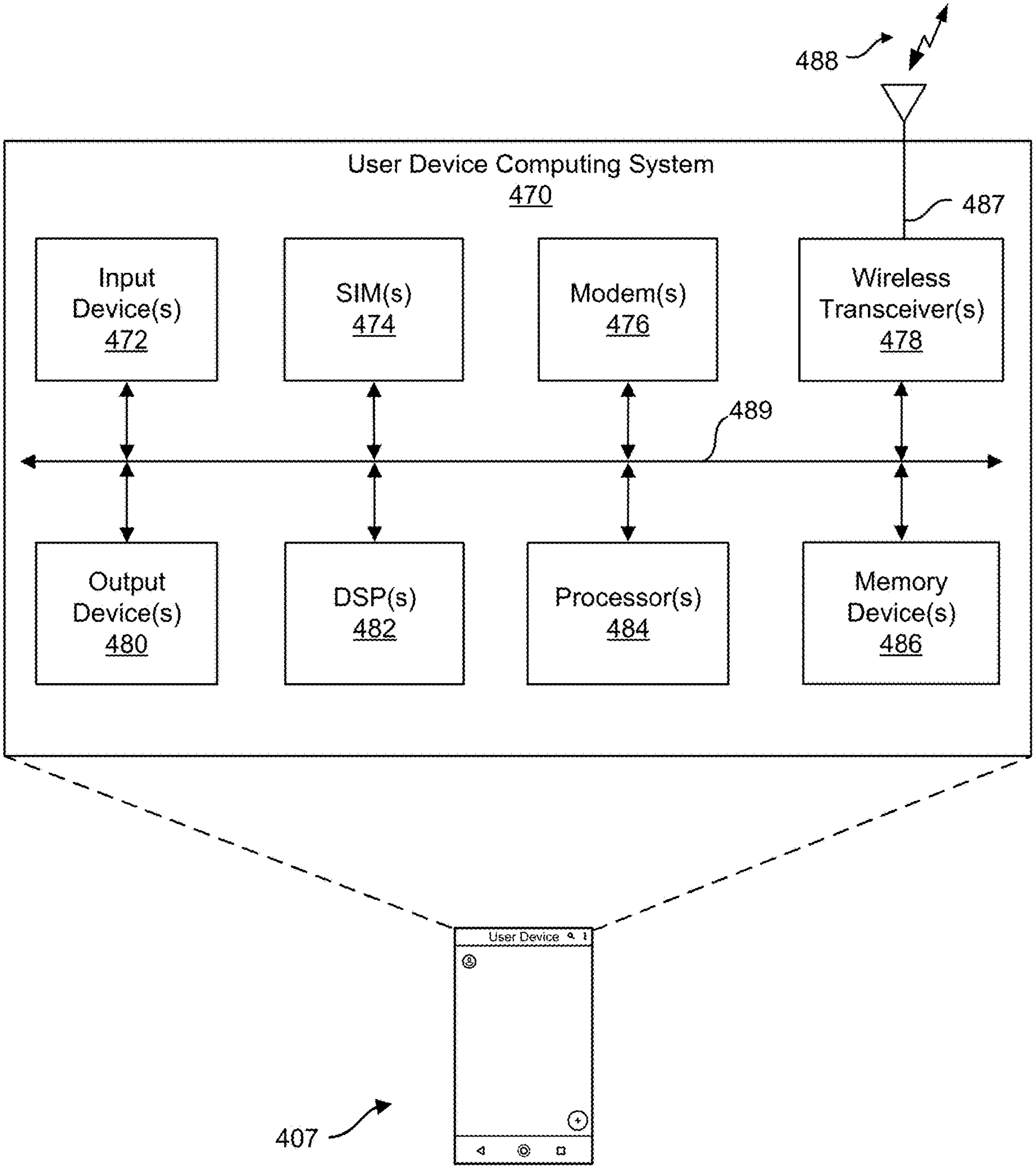
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAs, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5A:
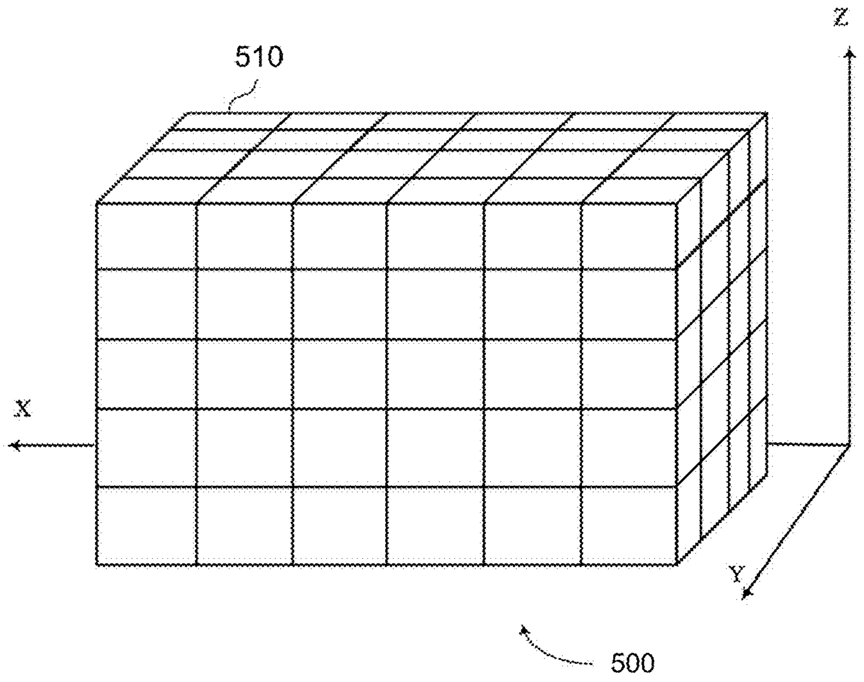
FIG. 5A is a diagram illustrating an example of a 3D aerial zone configuration, in accordance with some examples.
Figure 5B:
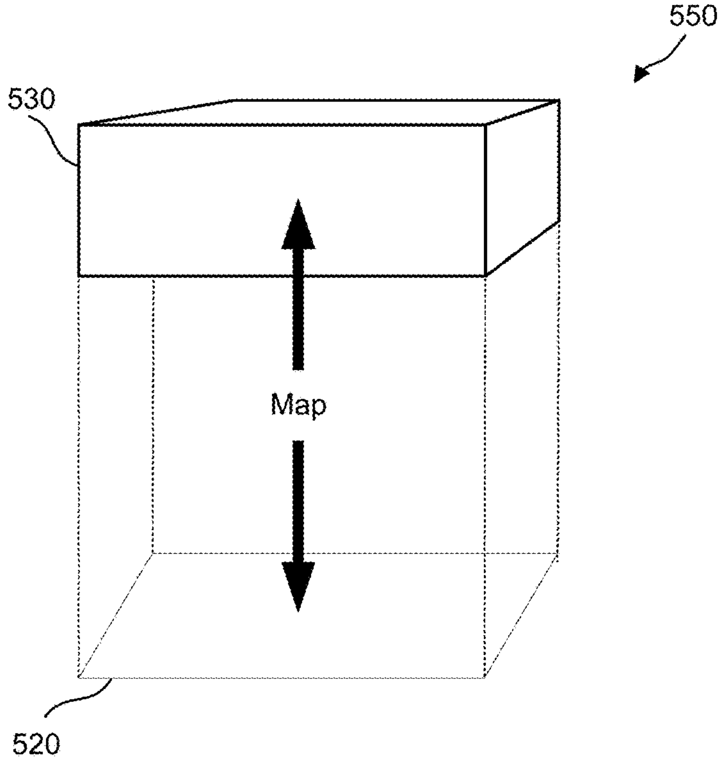
FIG. 5B is a diagram illustrating an example of a mapping between a 3D aerial zone and a 2D surface zone based on horizontal location, in accordance with some examples.
Figure 5C:
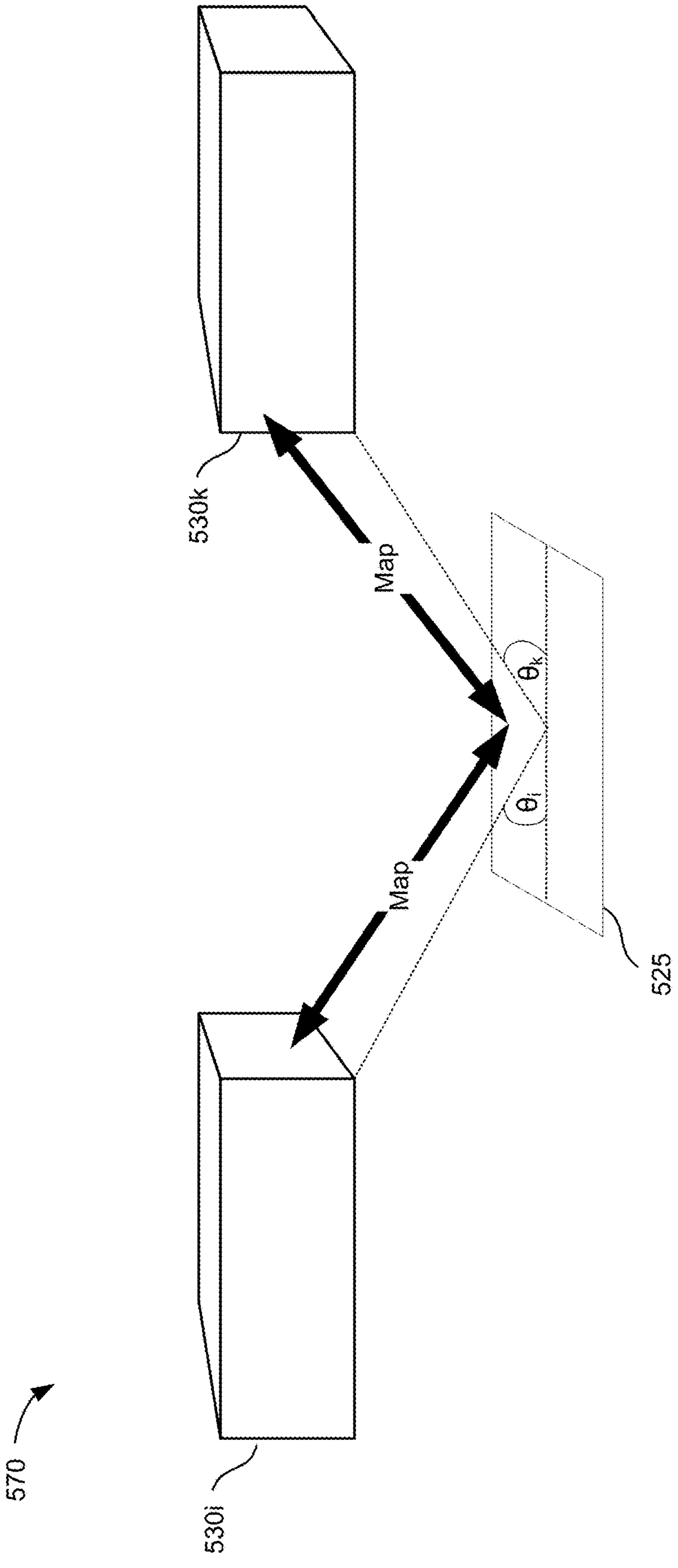
FIG. 5C is a diagram illustrating an example of a mapping between a 3D aerial zone and a 2D surface zone based on elevation angle, in accordance with some examples.

As noted previously, systems and techniques are described herein for performing aerial UE policy configuration and/or management for differentiated aerial UE behavior over a plurality of aerial flight zones. As used herein, the term "aerial flight zone" may be interchangeable with "aerial zone." An aerial flight zone can be a three-dimensional (3D) volume of space above the surface of the earth. Aerial flight zones can be associated with a set of coordinates that define the 3D volume. In some aspects, an airspace in which aerial UE operations are performed can be associated with a plurality of aerial flight zones. For instance, one or more aerial flight zones can be provided along a vertical axis (e.g., z-axis) of the airspace, one or more aerial flight zones can be provided along an x-axis axis of the airspace, and/or one or more aerial flight zones can be provided along a y-axis of the airspace. The plurality of aerial flight zones may have the same dimensions as one another and/or may have different dimensions from one another. Aerial flight zones can be provided with various shapes. FIGS. 5A-C are diagrams illustrating various examples of 3D zones (e.g., aerial zones) and/or 2D zones (e.g., terrestrial ground zones or cells of a cellular network).

For instance, FIG. 5A is a diagram illustrating an example configuration 500 of a plurality of three-dimensional aerial zones 510. The aerial zone configuration 500 may be associated with or used to implement aspects of the wireless communications systems as described with reference to FIGS. 1-4. For example, the aerial zone configuration 500 may represent airspaces divided into a plurality of 3D aerial zones 510, which may be used to indicate the geographic location information for implementing various aerial UE policies.

In some aspects, the aerial zone configuration 500 can include a plurality of aerial zones 510 that extend in three dimensions (e.g., an X dimension, a Y dimension, and a Z dimension). The aerial zones 510 may be examples of cubes or other 3D shapes. As an illustrative example, the airspace covered by the aerial zone configuration 500 may be defined by dividing the airspace into 3D cubes or cuboids. The size of the 3D cubes may be configured at one or more base stations, gNBs, satellites, and/or one or more aerial UEs included in or associated with a wireless communication network (e.g., a cellular network). For example, the base stations and/or aerial UEs may be configured with a size of the cubes, a quantity or arrangement of the cubes, locations of the cubes (e.g., where the 3D airspace begins or end), or any combination thereof.

FIG. 5B is a diagram illustrating an example of a mapping 550 between an aerial zone 530 and a 2D ground zone 520 with a same or shared horizontal location. In one illustrative example, the 2D ground zone 520 can be the same as or similar to a cell of a cellular network. In one illustrative example, a plurality of aerial zones (e.g., such as the aerial zones 810 included in the example aerial zone configuration 500 illustrated in FIG. 5A, the aerial zone 530 of FIG. 5B, etc.) can be mapped to the 2D ground zone (e.g., cell) that is located directly beneath each respective one of the aerial zones. In some aspects, the corresponding 2D ground zone (e.g., cell) located directly beneath an aerial zone can be determined based on the horizontal coordinate(s) of the aerial zone, with the corresponding 2D ground zone (e.g., cell) identified based on having the same (or most similar) horizontal coordinate(s) to the aerial zone.

In some aspects, the mapping of aerial zones to 2D ground zones (e.g., cells of a cellular network) based on a common or shared horizontal location (e.g., the mapping of aerial zones to the 2D ground zones or cells directly below) can be implemented with a relatively lower computational complexity than various other mapping approaches. Based on the lower computational complexity of the common horizontal location-based mapping, such an aerial zone-cell mapping can be determined locally (e.g., onboard) by one or more aerial UEs; can be determined remotely by one or more base stations, gNBs, satellites, or other network entities; or a combination of the two. In some aspects, the aerial zone-cell mapping described above with respect to FIG. 5B can be determined in advance and provided to one or more aerial UEs as pre-determined data. In some examples, the aerial zone-cell mapping (e.g., such as the example mapping of FIG. 5B) can be determined in real-time, for example as needed during one or more aerial UE operations, as will be described in greater depth below.

In some examples, a vertical mapping of aerial zones to the 2D ground zones (e.g., cells) that are directly below (e.g., a mapping based on the aerial zones having a zero or minimal horizontal offset with respect to the their mapped 2D ground zones (e.g., cells)) can be associated with a probability of an aerial UE passing through or entering the aerial zone mapped to a particular 2D ground zone (e.g., cell). For example, in some cases, within a 100 km cell radius defined on a terrestrial surface, 90% of aircraft (e.g., aerial UEs) may be observed between 6-18 degrees of elevation angle with respect to the ground plane, etc.

FIG. 5C is a diagram illustrating an example of a mapping 570 between aerial zones 530*i*, 530*k* and a 2D ground zone (e.g., cell) 525 based on an elevation angle between the ground plane and each aerial zone. In one illustrative example, an aerial zone can be mapped to the 2D ground zone (e.g., cell) with which the aerial zone forms a pre-determined elevation angle (or the 2D ground zone (e.g., cell) with which the aerial zone forms an elevation angle that falls within a pre-determined range of angular values). For example, an aerial zone can be mapped to the 2D ground zone (e.g., cell) with which the aerial zone forms an elevation angle determined to be associated with a greatest aircraft (e.g., aerial UE) occurrence probability. In some cases, an aerial zone can be mapped to a 2D ground zone (e.g., cell) with which the aerial zone forms an elevation angle between 6 and 18 degrees.

In some examples, a respective line can be extended from the plane of a given 2D ground zone (e.g., cell) 525 to each aerial zone of a plurality of aerial zones (e.g., shown here as the aerial zones 530*i* and 530*k*, although it is noted that a greater quantity of aerial zones can be utilized or otherwise present). An elevation angle can be determined between the 2D ground zone (e.g., cell) 525 and each aerial zone of the plurality of 3D aerial zones. For example, an elevation angle of $\theta_i$ can be formed between the plane of 2D ground zone (e.g., cell) 525 and a first aerial zone 530*i*; an elevation angle of $\theta_k$ can be formed between the plane of 2D ground zone (e.g., cell) 525 and a second aerial zone 530*k*. Of the plurality of aerial zones analyzed with respect to the 2D ground zone (e.g., cell) 525, in some examples, only a single aerial zone may be selected and mapped to the 2D ground zone (e.g., cell) 525. In such examples, the remaining aerial zones may be subsequently considered for mapping to other 2D ground zones (e.g., cells), or may be allowed to remain unmapped to a 2D ground zone (e.g., cell). In some aspects, the mapping of aerial zones to 2D ground zones (e.g., cells) can be performed based on determining, for an aerial zone, the 2D ground zone (e.g., cell) with which the aerial zone forms an elevation angle that increases or maximizes the aircraft occurrence probability within the 2D ground zone (e.g., cell). In some aspects, a set of aerial zones (e.g., the plurality of aerial zones 510 included in the 3D aerial zone configuration 500 illustrated in FIG. 5A) may be mapped to one or more 2D ground zones or cells (e.g., such as the 2D ground zone 520 of FIG. 5A, the 2D ground zone 525 of FIG. 5C, etc.). In some examples, a 2D ground zone (e.g., cell) can be mapped to one or more aerial zones. In some examples, a 2D ground zone (e.g., cell) can be mapped to either a single aerial zone or remain unmapped.

Figure 6:
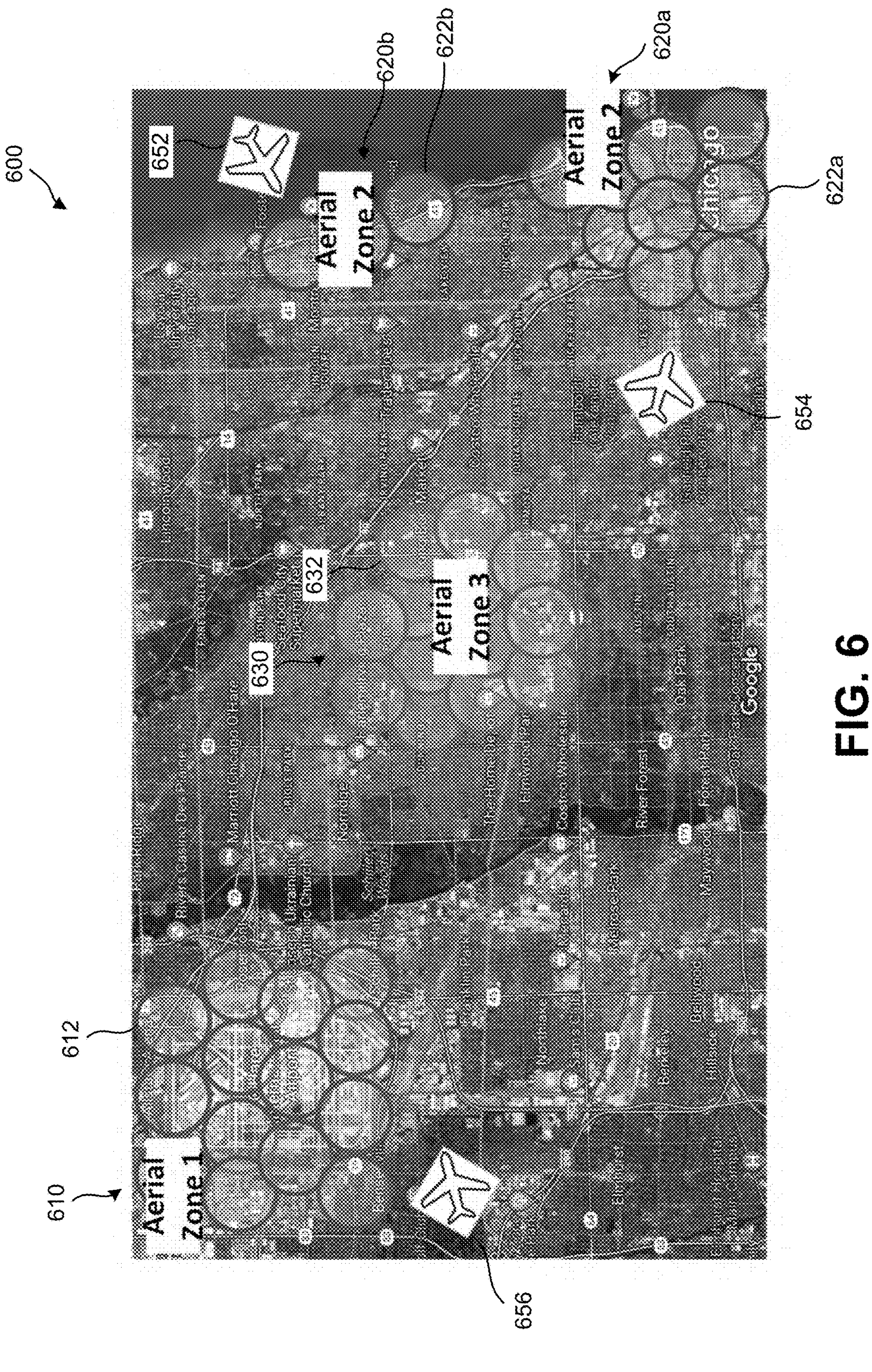
FIG. 6 is a diagram illustrating an example of aerial flight zone information corresponding to a plurality of cells, in accordance with some examples.

FIG. 6 is a diagram 600 illustrating an example of aerial flight zone information (e.g., also referred to as "aerial zone information") corresponding to a plurality of cells, in accordance with some examples. In some aspects, the plurality of cells can be included in a cellular network. For instance, the plurality of cells may be included in the same cellular network. In some examples, the plurality of cells can be included in multiple and/or different cellular networks. Each cell can be associated with a geographic area or region. For instance, each cell of the plurality of cells of FIG. 6 are shown as enclosing an approximately circular area or region, although various other cell geometries, sizes, dimensions, etc., may also be utilized.

A first aerial zone 610 (e.g., aerial zone 1 of FIG. 6) can be associated with a first plurality of cells 612. A third aerial zone 630 (e.g., aerial zone 3 of FIG. 6) can be associated with a third plurality of cells 632. In some examples, the one or more cells associated with an aerial zone can be contiguous or overlapping (or partially overlapping) cells. In some examples, at least a portion of the one or more cells associated with an aerial zone can be discontinuous or non-overlapping. For instance, a second aerial zone (e.g., aerial zone 2 of FIG. 6) can include a first portion 620*a* and a second portion 620*b* that are non-overlapping with one another. The first portion 620*a* of the second aerial zone can be associated with a plurality of cells 622*a*. The second portion 620*b* of the second aerial zone can be associated with a plurality of cells 622*b*, which can be different from the plurality of cells 622*a*.

In some aspects, each cell of a plurality of cells of a cellular network can be associated with at least one aerial zone (e.g., one of the aerial ones 610, 620*a*, 620*b*, 630 of FIG. 6). In some aspects, a first subset of cells of the plurality of cells of a cellular network can be associated with at least one aerial zone, and a remaining subset of cells of the plurality of cells of the cellular network may be unassociated with an aerial zone.

A cell can be associated with one aerial zone and/or can be associated with multiple different aerial zones. Aerial zones can correspond to different policies for aerial UEs that are operating or located within (or nearby to) the aerial zones. Different policies can correspond to different aerial UE behavior within the corresponding aerial zone(s), for example relating to usage of connectivity services and/or flight services associated with the cellular network. For instance, aerial UEs (e.g., such as the aerial UIEs 652, 654, 656 of FIG. 6) can be provided with a first policy associated with the first aerial zone 610, a second policy associated with the second aerial zones 620*a*, 620*b*, and a third policy associated with the third aerial zone 630 (e.g., as will be described below with respect to FIG. 7).

In one illustrative example, the various aerial UE policies corresponding to a plurality of aerial zones (e.g., aerial zones 610, 620*a*, 620*b*, 630) can be provided to one or more aerial UEs in a policy information transmitted by a network entity associated with the cellular network. The policy information can correspond to a communication interface of the cellular network, such as a PC5 interface. The policy information can include a plurality of policies, where each respective policy corresponds to a particular aerial zone identifier. An aerial zone identifier can be indicative of a type of aerial zone. For instance, a first aerial zone identifier can be indicative of an "aerial zone 1" type (e.g., corresponding to the first aerial zone 610). A second aerial zone identifier can be indicative of an "aerial zone 2" type (e.g., corresponding to the second aerial zones 620*a*, 620*b*). A third aerial zone identifier can be indicative of an "aerial zone 3" type (e.g., corresponding to the third aerial zone 630).

As noted above, different aerial zone identifiers (e.g., different types of aerial zones) can correspond to different aerial UE policies. For instance, aviation regulators may require aerial UEs to behave differently in terms of usage of connectivity services and/or flight services, based on the geographical location where the aerial UE is flying or otherwise located (e.g., including altitude). In some aspects, the use of connectivity services such as sidelink or PC5 for transmitting detect and avoid (DAA) beacons and DAA deconfliction messages, for broadcast remote ID (BRID) messages, and/or the use of Uu connectivity may be associated with aerial UE policies that depend on the particular area or geographic region where the aerial UE is located.

In one illustrative example, each respective aerial UE policy of a plurality of aerial UE policies included in a policy information provided to an aerial UE can be mapped to or otherwise associated with one or more aerial zone identifiers (e.g., types of aerial zones). The mapping between aerial UE policies and aerial zone identifiers implemented at an aerial UE (e.g., included in policy information transmitted to the aerial UE) can be the same as or similar to the mapping between aerial UE policies and aerial zone identifiers implemented by an Unmanned Aircraft System (UAS) Traffic Management (UTM) network entity. As will be described in greater depth below, the UTM network entity can generate aerial zone configuration information that is provided to the cellular network and used to configure the various aerial zones (e.g., such as aerial zones 610, 620*a*, 620*b*, 630 of FIG. 6). In one illustrative example, the policy information provided to aerial UEs and the aerial zone configuration information from the UTM can utilize the same set of aerial zone identifiers. For instance, the set of aerial zone identifiers can be exchanged or shared between a policy writing entity associated with creating the various aerial UE policies and the UTM associated with creating the aerial zone configuration information. The policy writing entity and the UTM may use the same aerial zone policies in the aerial UE policy information and the aerial zone configuration information, respectively, or may use different aerial zone policies.

For example, the aerial zone configuration information may utilize aerial policies that are broader or more general than the aerial policies that are implemented at various aerial UEs. For instance, the first aerial zone 610 depicted in FIG. 6 may be associated with an aerial zone identifier (e.g., aerial zone type) that is the most restrictive, as the first aerial zone 610 corresponds to highly congested airspace over an airport, where aerial UE operations may be prohibited, strictly regulated, require the most frequent communications, etc. The second aerial zone 620*a*, 620*b* may be associated with an aerial zone identifier (e.g., aerial zone type) that is moderately restrictive, as the second aerial zone 620*a*, 620*b* may correspond to moderately congested airspace over densely populated urban centers, downtown cores, sporting venues, etc. The third aerial zone 630 may be associated with an aerial zone identifier (e.g., aerial zone type) that is minimally restrictive, as the third aerial zone 630 may correspond to low-congestion airspace that is located over suburban areas with relatively low amounts of other air traffic.

In one illustrative example, aerial zone configuration information can be received from a UTM (e.g., a UTM AF and/or an AF in the aviation domain) that is indicative of the locations of the three aerial zones of FIG. 6 and that is further indicative of corresponding aerial policies. As noted above, the aerial policies indicated for the aerial zones in the aerial zone configuration information may be broader or more general than the actual policies that are implemented by aerial UEs operating within one of the aerial zones. For instance, the aerial zone configuration information may indicate that aerial zone 1 (e.g., first aerial zone 610) requires a most restrictive aerial policy to be implemented by aerial UEs, that aerial zone 2 (e.g., second aerial zones 620*a*, 620*b*) requires a moderately restrictive aerial policy to be implemented by aerial UEs, and that aerial zone 3 (e.g., third aerial zone 630) requires a minimally restrictive aerial policy to be implemented by aerial UEs. Aerial UEs entering or located within one of the aerial zones 610, 620*a*, 620*b*, 630 may select an appropriate policy from the available plurality of policies provided to the aerial UEs in the policy information transmitted by the cellular network (e.g., or a network entity thereof). Aerial UEs located outside of one of the aerial zones 610, 620*a*, 620*b*, 630 (e.g., connected to a cell that is not mapped to one of the aerial zones) may be configured with a default policy that can be included in the policy information and used for cells that are not mapped to any aerial zones.

Figure 7:
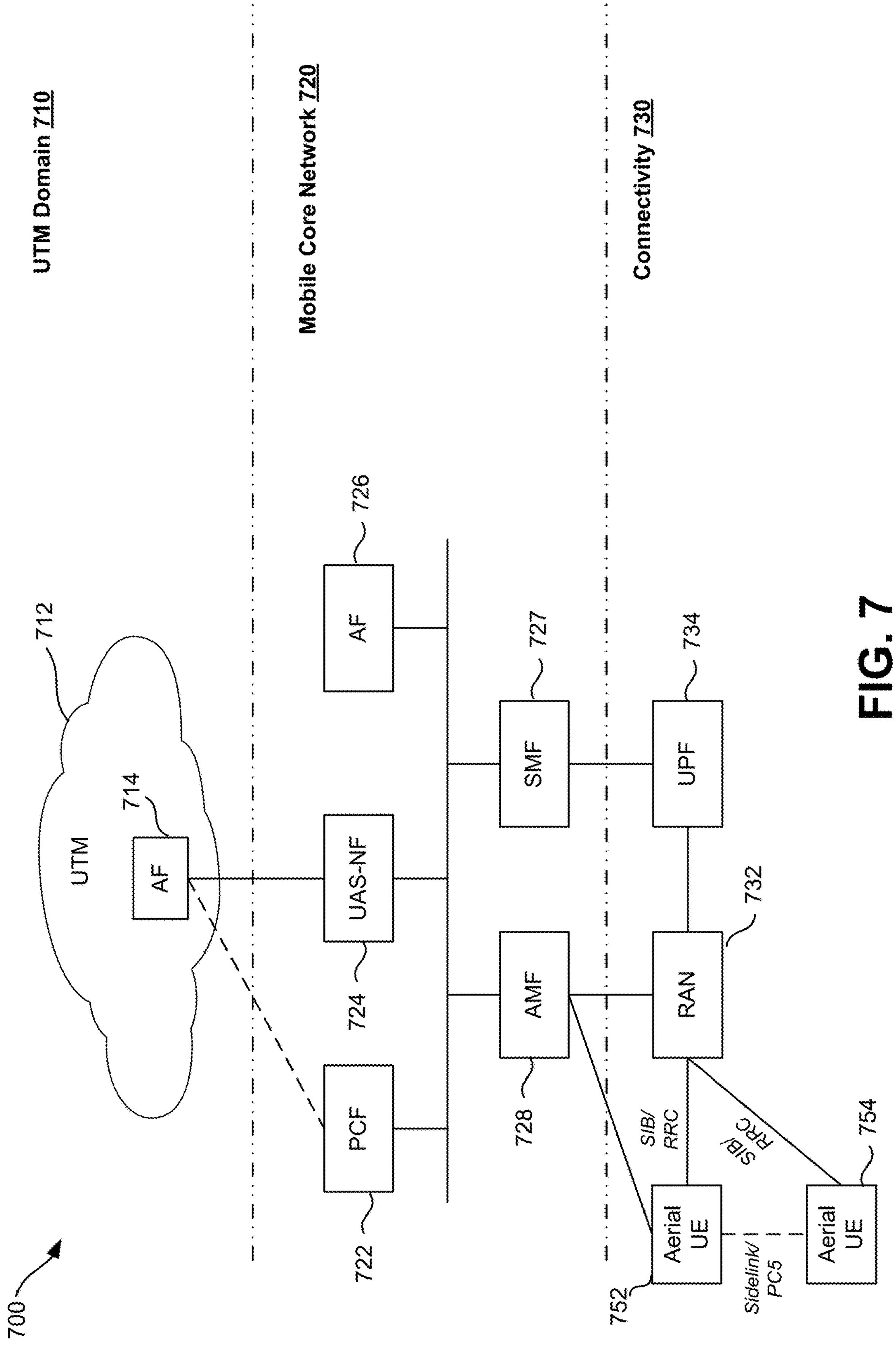
FIG. 7 is a diagram illustrating an example network architecture that can be used for wireless communications with one or more aerial UEs, in accordance with some examples.

FIG. 7 is a diagram illustrating an example network architecture 700 that can be used for wireless communications with one or more aerial UEs, in accordance with some examples. The network architecture 700 can include a UTM domain 710, a mobile core network 720, and connectivity 730. In some aspects, the UTM domain 710 may also be referred to as an "aviation domain." The UTM domain 710 (e.g., aviation domain) can be associated with providing and/or managing aviation regulation, including aviation regulation for aerial UEs. For instance, the UTM domain 710 can be associated with one or more aviation regulator entities for a particular area, region, country, etc.

UTM domain 710 can include an Unmanned Aircraft System (UAS) Traffic Management (UTM) entity 712. UTM 712 can be implemented as a traffic management ecosystem for uncontrolled operations. UTM 712 can be separate from existing Air Traffic Management (ATM) systems associated with crewed aircraft flights and operations. In other examples, UTM 712 can be included in or combined with existing ATM systems. In one illustrative example, UTM 712 can be associated with providing services, roles and responsibilities, information architecture, data exchange protocols, software functions, infrastructure, and/or performance requirements for enabling the management of low-altitude uncontrolled drone and/or aerial UE operations.

UTM domain 710 can include one or more Application Functions (AFs), such as the AF 714. In one illustrative example, the AF can be included in the UTM 712, and may be referred to as a UTM AF (e.g., AF 714 included in UTM 712 can be referred to as a UTM AF). In some aspects, the AF 714 (e.g., UTM AF) may be associated with and/or deployed by a UAS operator. The UAS operator may be associated with one or more aerial UEs, such as the aerial UEs 752, 754 of FIG. 7.

In some examples, the UTM AF 714 can be used to provide communications between UTM domain 710 and mobile core network 720. For instance, UTM AF 714 can communicate with a Policy Control Function (PCF) of mobile core network 720 and/or can communicate with a corresponding Network Function (NF) of the mobile core network 720. In one illustrative example, UTM AF 714 can communicate with a UAS-NF 724 included in the mobile core network 720. UAS-NF 724 can be implemented as a Network Exposure Function (NEF) of the mobile core network 720. For instance, UAS-NF 724 can be provided as an implementation of an NEF within mobile core network 720.

In some cases, the mobile core network 720 can be a cellular network, among various other wireless communication networks. For example, the cellular network can include the mobile core network 720 and the connectivity 730 (e.g., where the connectivity 730 includes the Radio Access Network (RAN) associated with the mobile core network 720 of the cellular network). In some examples, mobile core network 720 can be associated with a Mobile Network Operator (MNO).

Mobile core network 720 can additionally include one or more Afs 726, an Application Management Function (AMF) 728, and a Session Management Function (SMF) 727. AMF 728 can be used to communicate with the RAN 732 included in connectivity 730. In some aspects, AMF 728 may additionally be used to communicate with one or more (or all) of the aerial UEs (e.g., such as aerial UEs 752, 754). SMF 727 can be used to communicate with one or more User Plane Functions (UPFs), such as the UPF 734 included in connectivity 730.

UPF 734 can be used to communicate with RAN 732. RAN 732 can be used to communicate with one or more (or all) of the aerial UEs associated with the cellular network (e.g., aerial UEs 752, 754). For instance, RAN 732 can communicate with aerial UE 752, 754 using a System Information Broadcast (SIB) message, using a Radio Resource Control (RRC) message, among various other messages and/or communication protocols. Aerial UEs may communicate with one another over sidelink and/or PC5.

As mentioned previously, the systems and techniques described herein can be used to perform aerial UE policy distribution and/or management. An aerial UE (e.g., aerial UE 752, 754) can be provided policy information indicative of one or more policies associated with the use of connectivity services of a cellular network. In some cases, the policy information can be associated with or indicative of a frequency of messages transmitted by the aerial UE using a particular connectivity service of the cellular network. For instance, the policy information can be indicative of a frequency of messages sent over PC5 for broadcast remote ID (BRID) messages, detect and avoid (DAA) messages, etc. PC5 messages can be transmitted, for example, between the aerial UEs 752 and 754 using the PC5/sidelink depicted in FIG. 7. The frequency of messages sent using the particular connectivity service (e.g., among various other aerial policies) can depend on the aerial flight zone in which the aerial UE is located. The policy information for the aerial UE (e.g., also referred to herein as aerial policy information) may be provided to the aerial UE at the application level of the cellular network (e.g., at an application level associated with mobile core network 720) and/or can be provided to the aerial UE as part of a set of policies provided to the aerial UE by a mobile network operator (MNO) or other mobile operator associated with the mobile core network 720 and/or connectivity 730. For instance, the policy information can be provided to an aerial UE as part of one or more PC5 configuration policies configured by the mobile core network 720 (e.g., MNO), and transmitted from PCF 722 to the aerial UEs 752, 754.

In some aspects, an UTM 712 can provide aerial flight zone configuration information to mobile core network 720. For instance, UTM AF 714 can transmit aerial flight zone configuration information to the mobile core network 720, as will be described in greater depth below. The aerial flight zone configuration information from UTM AF 714 can be indicative of a location of each aerial flight zone and can be indicative of one or more aerial flight zone identifiers (e.g., aerial flight zone types) associated to each aerial flight zone. In one illustrative example, the UTM 712 (or UTM AF 714) can provide aerial flight zone configuration information to mobile core network 720 via the UAS-NF 724 (e.g., or other NEFs included in mobile core network 720). In another illustrative example, UTM 712 (or UTM AF 714) can provide aerial flight zone configuration information to mobile core network 720 via an interface to PCF 722. In another illustrative example, UTM 712 (or UTM AF 714) can provide aerial flight zone configuration information to mobile core network 720 via an OAM interface.

The aerial flight zone configuration information provided by the UTM domain 710 can be indicative of a definition of the various aerial flight zones, for example in terms of geographical areas that can be mapped to the locations of a plurality of cells of the cellular network (e.g., cells of RAN 732) and identifiers (e.g., types) associated to the aerial flight zones. In some examples, the aerial flight zone configuration information can be dynamic, and for example may be based on conditions determined by the UTM 712 or UTM AF 714. For instance, the UTM domain 710 (e.g., UTM 712 or UTM AF 714) can provide aerial flight zone configuration information indicating that a first aerial flight zone will be labeled as zone type A during a first set of times and will be labeled as zone type B during a second set of times. In such examples, an aerial UE 752, 754 that is provided with different aerial policies for the zone type A and the zone type B will implement the corresponding different aerial policies within the first aerial flight zone depending on whether the current time is included in the first set of times or the second set of times.

In one illustrative example, mobile core network 720 can map each aerial flight zone to one or more corresponding cells (e.g., cells associated with RAN 732) that are within each aerial flight zone indicated by the aerial flight zone information from UTM domain 710. For instance, mobile core network 720 can map each aerial flight zone to a system information broadcast (SIB) group or tracking area that includes multiple cells of a plurality of cells of the cellular network (e.g., of RAN 732).

In some examples, PCF 722 or UAS-NF 734 can be used to map each aerial flight zone to the one or more corresponding cells of RAN 732. The determined mapping information can be provided to AMF 728, which may transmit the mapping information to RAN 732. From the RAN 732, the one or more aerial zone identifiers (e.g., aerial zone types) mapped to each cell can be transmitted to the corresponding cells for broadcast to the aerial UEs 752, 754. For instance, cells can broadcast (e.g., in a SIB or RRC message) information indicative of one or more aerial zone identifiers (e.g., aerial zone types) currently associated to the cell. Based on receiving the aerial zone identifier information for a particular cell, an aerial UE 752, 754 can determine and apply a corresponding policy for the received aerial zone identifier (s) for the particular cell.

In one illustrative example, UTM 712 (or UTM AF 714) included in the UTM domain 710 can transmit the aerial zone configuration information to UAS-NF 724 included in the mobile core network 720. The UAS-NF 724 can determine a mapping between the geographical location or coordinates of each aerial zone (e.g., determined based on the aerial zone configuration information) and a plurality of cells associated with RAN 732. As mentioned previously, the mapping can determine one or more cells that are within each aerial zone (e.g., that are within a footprint of each aerial zone). A cell may be included in one aerial zone or may be included in no aerial zones. In some cases, a cell may be included in multiple aerial zones. Based on the aerial zone configuration information transmitted from UTM 712 or UTM AF 714 to the UAS-NF 724, the UAS-NF 724 can additionally obtain or determine the one or more aerial zone identifiers (e.g., aerial zone types) corresponding to each of the aerial zones. A cell that is mapped to a particular aerial zone can additionally be mapped to the same one or more aerial zone identifiers that are associated with the particular aerial zone (e.g., as indicated by the aerial zone configuration information). The UAS-NF 724 can generate mapping information indicative of one or more aerial zones that are mapped to each cell within an aerial zone.

In some aspects, the mapping information from the UAS-NF 724 can be provided to AMF 728 and/or RAN 732, as noted above. For instance, UAS-NF 724 may provide the aerial zone identifier-cell mapping information to AMF 728 in examples where the AMF processes the aerial zone identifier-cell mapping information to create one or more Tracking Area (TA) lists. UAS-NF 724 may provide the aerial zone identifier-cell mapping information to RAN 732 so that each cell can be provided the corresponding one or more aerial zone identifiers to broadcast (e.g., in a SIB message, RRC message, etc.).

In another example, the mapping information from the UAS-NF 724 can be provided to an OAM function of mobile core network 720. The OAM function can perform one or more operations, administration and maintenance operations (e.g., logging, telemetry, etc.). From the OAM function, the mapping information mapping aerial zone identifiers to cells of the network can be provided to the AMF 728 and/or RAN 732, as described above.

In another illustrative example, UTM 712 (or UTM AF 714) included in the UTM domain 710 can transmit the aerial zone configuration information to PCF 722 included in the mobile core network 720. The PCF 722 can determine a mapping between the geographical location or coordinates of each aerial zone (e.g., determined based on the aerial zone configuration information) and a plurality of cells associated with RAN 732. As mentioned previously, the mapping can determine one or more cells that are within each aerial zone (e.g., that are within a footprint of each aerial zone). A cell may be included in one aerial zone or may be included in no aerial zones. In some cases, a cell may be included in multiple aerial zones. Based on the aerial zone configuration information transmitted from UTM 712 or UTM AF 714 to the PCF 722, the PCF 722 can additionally obtain or determine the one or more aerial zone identifiers (e.g., aerial zone types) corresponding to each of the aerial zones. A cell that is mapped to a particular aerial zone can additionally be mapped to the same one or more aerial zone identifiers that are associated with the particular aerial zone (e.g., as indicated by the aerial zone configuration information). The PCF 722 can generate mapping information indicative of one or more aerial zones that are mapped to each cell within an aerial zone. The aerial zone identifier-cell mapping information generated or determined by PCF 722 can be provided to AMF 728 and/or RAN 732, as described above, and the corresponding aerial flight zone value or identifier can be provided to respective cells for broadcast to aerial UEs.

Aerial UEs can receive a SIB or RRC message broadcast by a cell and may use the message to determine one or more aerial flight zone values or identifiers for the cell. Based on the aerial flight zone values or identifiers, the aerial UE can determine an appropriate or corresponding policy to implement when operating within or near the cell. In one illustrative example, an aerial UE can additionally receive policy information from mobile core network 720 and may determine a policy to apply based on analyzing the received one or more aerial flight zone values or identifiers for a cell against the received policy information. The policy information can correspond to a communication interface of the cellular network, such as a PC5 interface, among various others. The policy information can include a plurality of policies, where each respective policy corresponds to a particular aerial zone identifier.

For instance, aerial UEs can be configured with policy information that includes a plurality of policies associated with different uses or configurations of network connectivity services for various applications, regions, spectra, etc., within which the aerial UE may operate. In one illustrative example, the policy information can be indicative of a periodicity for an aerial UE to apply to each type of communication (e.g., Broadcast Remote ID (BRID) beacon and Detect And Avoid (DAA) broadcast beacon, deconfliction messages, etc.). Policy information can additionally be indicative of one or more resource control parameters associated with a configured application running on the aerial UE. In some aspects, policy information can be based on a mission of the aerial UE (e.g., mission parameters, mission type, operator information, etc.). For instance, civilian aerial UEs may receive policy information that configures the aerial UEs to avoid (e.g., not enter) cells that correspond to aerial zones with temporary flight restrictions, such as over stadiums during sporting events, etc. Law enforcement or military aerial UEs may receive a different set of policy information that configures the aerial UEs to enter the cells that correspond to aerial zones with temporary flight restrictions. The one or more cells corresponding to the aerial zone(s) can broadcast the same aerial zone identifier type or value to both the civilian aerial UEs and the law enforcement aerial UEs. Based on civilian aerial UEs receiving different policy information from law enforcement aerial UEs, the two types of aerial UEs can implement different behaviors based on receiving the same aerial zone identifier type or value.

In another example, policy information provided to aerial UEs (e.g., provided to aerial UEs 752 and/or 754 by mobile core network 720) can be indicative of a transmit power to be applied by the aerial UE for each type of communication. In some aspects, the transmit power can be a PC5 parameter included in or indicated by the policy information provided to the aerial UE(s). For instance, an aerial UE located in or approaching a cell that corresponds to a rural area (or rural aerial flight zone) can be configured to implement a policy for relatively infrequent and relatively low power DAA beacons, deconfliction messages, etc., based on the relatively low probability of collisions or conflicts. The policy information can map the infrequent and lower power DAA beacon/deconfliction message policy to an aerial zone identifier indicative of a rural area. Based on receiving the aerial zone identifier indicative of a rural area, the aerial UE can implement the corresponding policy determined based on the policy information.

In another example, policy information provided to aerial UEs can be indicative of one or more beam forming parameters to utilize for various or particular applications, spectrum, and/or message types. In one illustrative example, the policy information provided to aerial UEs by the mobile core network 720 can include additional information, rules, conditions, etc. For instance, an aerial UE can determine a policy to implement for a cell having a particular aerial zone identifier based on additional factors such as flight altitude ranges (e.g., whether the aerial UE is above or below a threshold, within a range of altitudes, etc.). For example, the aerial UE can implement a first policy for the particular aerial zone identifier when the aerial UE is above an altitude threshold and can implement a second (e.g., different) policy for the same particular aerial zone identifier when the aerial UE is at or below the altitude threshold, etc. Aerial UE policy selection (e.g., from the plurality of policies included in the policy information provided to the aerial UE) can additionally be based on a geographic location of the aerial UE, a tracking area (TA) ID in which the aerial UE is located, a time of day, a date, etc. In some aspects, policy information provided to aerial UEs can include one or more default entries (e.g., default policies) that may be applied when no aerial zone type (e.g., aerial zone identifier or value) is available to the aerial UE. For example, no aerial zone type may be available to the aerial UE when the aerial UE is within a cell that does not correspond to an aerial zone and/or when the network otherwise does not transmit one or more aerial zone type identifiers or values for the aerial UE's current cell location.

In some aspects, an aerial UE configuration (e.g., policy or policy-based configuration) can be changed or updated by a static configuration on the aerial UE. In one illustrative example, an aerial UE configuration can be changed or updated dynamically by or through the mobile core network 720, as will be described in greater depth below.

Aerial UE policy information (also referred to as "policy information") can be provide to an aerial UE from the UTM domain 710, from the mobile core network 720, or a combination of the two. For instance, in one illustrative example aerial UE policy information can be provided or configured for the aerial UEs 752, 754 by an MNO (e.g., an operator of mobile core network 720). In such examples, the aerial UE policy information can be provided by PCF 722. For instance, PCF 722 can transmit aerial UE policy information to AMF 728, which subsequently provides the aerial UE policy information to the aerial UEs 752, 754. In examples where the aerial UE policy information corresponds to aerial UE usage of PC5 network resources or services, the policy information can be the same as or similar to (or may include) PC5 configuration information, and may be transmitted to aerial UEs using 3GPP mechanisms, at the application layer, etc.

Aerial UE policy information can additionally, or alternatively, be provided to one or more aerial UEs by the application layer of or associated with mobile core network 720. For instance, aerial UE policy information can be provided by one or more AFs in mobile core network 720. In one illustrative example, aerial UE policy information can be provided by AF 726 and delivered at the application layer (e.g., transmitted from AF 726 to SMF 727, to UPF 734 and on to RAN 732 for final broadcast or transmission to the aerial UEs 752, 754). When aerial UE policy information is delivered at the application layer, the aerial UE policy information can be transmitted to the aerial UEs 752, 754 over user plane connectivity.

In another illustrative example, aerial UE policy information can be provided to one or more aerial UEs by the UTM domain 710. In such examples, the UTM domain 710 can determine aerial UE policies in addition to determining the aerial zone configuration information (e.g., where both the aerial UE policies and the aerial zone configuration information may be separately mapped to the same set of aerial zone identifiers or type values). For instance, UTM 712 or UTM AF 714 can transmit aerial UE policy information from the UTM domain 710 to the UAS-NF 724 of mobile core network 720. The UAS-NF 724 can receive the aerial UE policy information from the UTM domain 710 and can forward the aerial UE policy information to the PCF 722. The aerial UE policy information can be transmitted from the PCF 722 to the aerial UEs 752, 754 as described above with respect to aerial UE policy information originating from the MNO or mobile core network 720 (e.g., originating from the PCF 722).

In some aspects, the mobile core network 720 (e.g., which may be implemented as a 5G core (5GC)) can provide aerial policy information to the aerial UEs 752, 754 over an N1 interface to the aerial UEs. In some examples, aerial policy information can be provided to the aerial UEs using the application layer, and may be delivered over user plane connectivity to the aerial UEs 752, 754.

Figure 8:
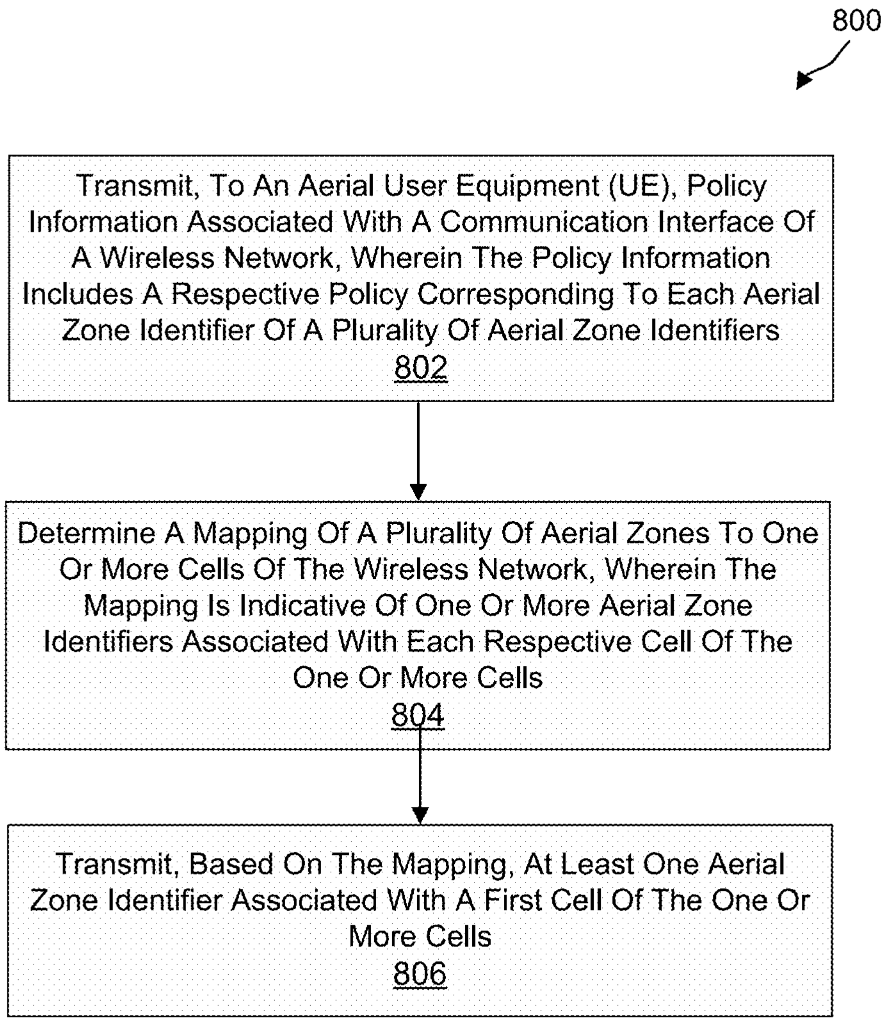
FIG. 8 is a flow diagram illustrating an example of a process for wireless communications performed at a network entity, in accordance with some examples.

FIG. 8 is a flowchart diagram illustrating an example of a process 800 for performing wireless communications at a network entity. The process 800 may be performed by a network entity or by a component or system (e.g., a chipset) of the network entity. The network node may be a base station (e.g., a gNB, an eNB, or other base station), a portion of the base station (e.g., a CU, DU, RU, RIC, or other portion of a base station having a disaggregated architecture) or other type of network entity. In some examples, the network entity can be a base station that is the same as or similar to one or more of the base stations of any of FIG. 1, FIG. 2, FIG. 3, etc. The operations of the process 800 may be implemented as software components that are executed and run on one or more processors (e.g., processor 1010 of FIG. 10 or other processor(s)). Further, the transmission and reception of signals by the wireless communications device in the process 800 may be enabled, for example, by one or more antennas and/or one or more transceivers (e.g., antenna(s) and/or wireless transceiver(s) of any of FIG. 2, FIG. 4, etc.).

At block 802, the process 800 includes transmitting, to an aerial user equipment (UE), policy information associated with a communication interface of a wireless network, wherein the policy information includes a respective policy corresponding to each aerial zone identifier of a plurality of aerial zone identifiers. For example, the wireless network can be a cellular network and the communication interface can be a PC5 interface or a sidelink communication interface.

In some cases the policy information can include multiple different policies, where each policy is indicative of respective parameter values for configuring the aerial UE to communicate using the communication interface of the wireless network. For instance, a first respective policy can be indicative of one or more of a first transmission power or a first frequency corresponding to a first connectivity service associated with the communication interface. A second respective policy can be indicative of one or more of a second transmission power or a second frequency corresponding to a second connectivity service associated with the communication interface, wherein the first respective policy is different from the second respective policy, and wherein the first connectivity service is different from the second connectivity service. For instance, the first connectivity service can be a PC5 broadcast remote ID (BRID) message service and the second connectivity service can be a PC5 detect and avoid (DAA) message service (e.g., the first respective policy corresponds to a broadcast remote ID (BRID) message service of a PC5 interface and the second respective policy corresponds to a detect and avoid (DAA) message service of a PC5 interface).

In some examples, the policy information includes a default policy corresponding to a subset of cells of a plurality of cells of the wireless network, wherein the subset of cells are not mapped to an aerial zone identifier. For instance, the default policy can correspond to the cells of the wireless network that are not mapped to the first aerial zone 610, the second aerial zone 620*a*, 620*b*, or the third aerial zone 630 of FIG. 6.

In some examples, each respective aerial zone identifier of the plurality of aerial zone identifiers is indicative of an aerial zone type. For example, a first aerial zone identifier can be indicative of an aerial zone type corresponding to first aerial zone 610 of FIG. 6, a second aerial zone identifier can be indicative of an aerial zone type corresponding to second aerial zones 620*a*, 620*b* of FIG. 6, and a third aerial zone identifier can be indicative of an aerial zone type corresponding to third aerial zone 630 of FIG. 6.

In some cases, each respective aerial zone type is associated with a different policy for the communication interface of the wireless network. In some examples, each respective aerial zone type is associated with a respective policy for resources corresponding to the communication interface of the wireless network. Each respective policy can be indicative of usage parameters for the resources, such as a frequency or spectrum, a transmit power, a transmit frequency or periodicity, etc. In some cases, the usage parameters can correspond to a respective frequency range included in a spectrum associated with the resources and/or can correspond to a respective geographical region of a plurality of geographical regions associated with the resources.

At block 804, the process 800 includes determining a mapping of a plurality of aerial zones to one or more cells of the wireless network, wherein the mapping is indicative of one or more aerial zone identifiers associated with each respective cell of the one or more cells. For instance, the plurality of aerial zones can include the first aerial zone 610, second aerial zones 620*a*, 620*b*, and third aerial zone 630 of FIG. 6. The one or more cells of the wireless network can be the same as or similar to the cells depicted in FIG. 6, including cells 612, 622*a*, 622*b*, and 630. The aerial zone identifiers can be indicative of the first aerial zone 610, second aerial zones 620*a*, 620*b*, and/or third aerial zone 630 of FIG. 6.

In some cases, the network entity can receive configuration information associated with the plurality of aerial zones and determine the mapping using the configuration information. The configuration information can be received from an Unmanned Aircraft System Traffic Management (UTM) network entity, which may be the same as or similar to the UTM network entity 712 and/or the UTM AF 714 of FIG. 7.

The configuration information may be indicative of one or more aerial zone identifiers associated with each respective aerial zone of the plurality of aerial zones and location information associated with each respective aerial zone of the plurality of aerial zones. For instance, the location information can comprise a two-dimensional footprint of each respective aerial zone, such as the 2D footprint 520 corresponding to the 3D aerial zone 530 of FIG. 5B. The mapping can be determined based on determining a subset of cells of a plurality of cells of the wireless network that are located within a two-dimensional footprint of a particular aerial zone. One or more aerial zone identifiers associated with the particular aerial zone can be mapped to each cell of the subset of cells. For instance, the mapping can be determined based on determining the subset of cells 612 that are included within the 2D footprint of first aerial zone 610 of FIG. 6, the subset of cells 622*a* that are within the 2D footprint of second aerial zone 620*a* of FIG. 6, the subset of cells 622*b* that are within the 2D footprint of second aerial zone 620*b* of FIG. 6, and/or the subset of cells 632 that are within the 2D footprint of third aerial zone 630 of FIG. 6.

In another example, the location information comprises a three-dimensional volume of each respective aerial zone. For instance, the location information can be indicative of the 3D volume 510 of FIG. 5*a*, the 3D volume 530 of FIG. 5B, the 3D volume 530*i* and/or 530*k* of FIG. 5C, etc. The mapping can be determined based on determining a subset of cells of a plurality of cells of the wireless network having a three-dimensional projection that intersects at least a portion of a three-dimensional volume of a particular aerial zone. One or more aerial zone identifiers associated with the particular aerial zone can be mapped to each cell of the subset of cells.

In some cases, the mapping for a particular aerial zone of the plurality of aerial zones can be determined based on determining a footprint of the particular aerial zone based on the location information. For instance, the footprint of the particular aerial zone can be mapped to one or more system information broadcast (SIB) areas of the wireless network. One or more aerial zone identifiers associated with the particular aerial zone can be mapped to each cell of one or more cells within the one or more SIB areas.

At block 806, the process 800 includes transmitting, based on the mapping, at least one aerial zone identifier associated with a first cell of the one or more cells. For instance, the network entity can transmit a system information broadcast (SIB) message indicative of at least one aerial zone identifier for the first cell. In some cases, the SIB message can be broadcast by RAN 732 of FIG. 7, for instance by a gNB associated with a particular cell of RAN 732. The SIB message can be indicative of the one or more aerial zone identifiers corresponding to the particular cell of RAN 732 that is associated with the gNB. In another example, the network entity can transmit an RRC message indicative of at least one aerial zone identifier for the first cell. In some cases, the RRC message can be transmitted by RAN 732 of FIG. 7, for instance by a gNB associated with a particular cell of RAN 732. The RRC message can be indicative of the one or more aerial zone identifiers corresponding to the particular cell of RAN 732 that is associated with the gNB.

Figure 9:
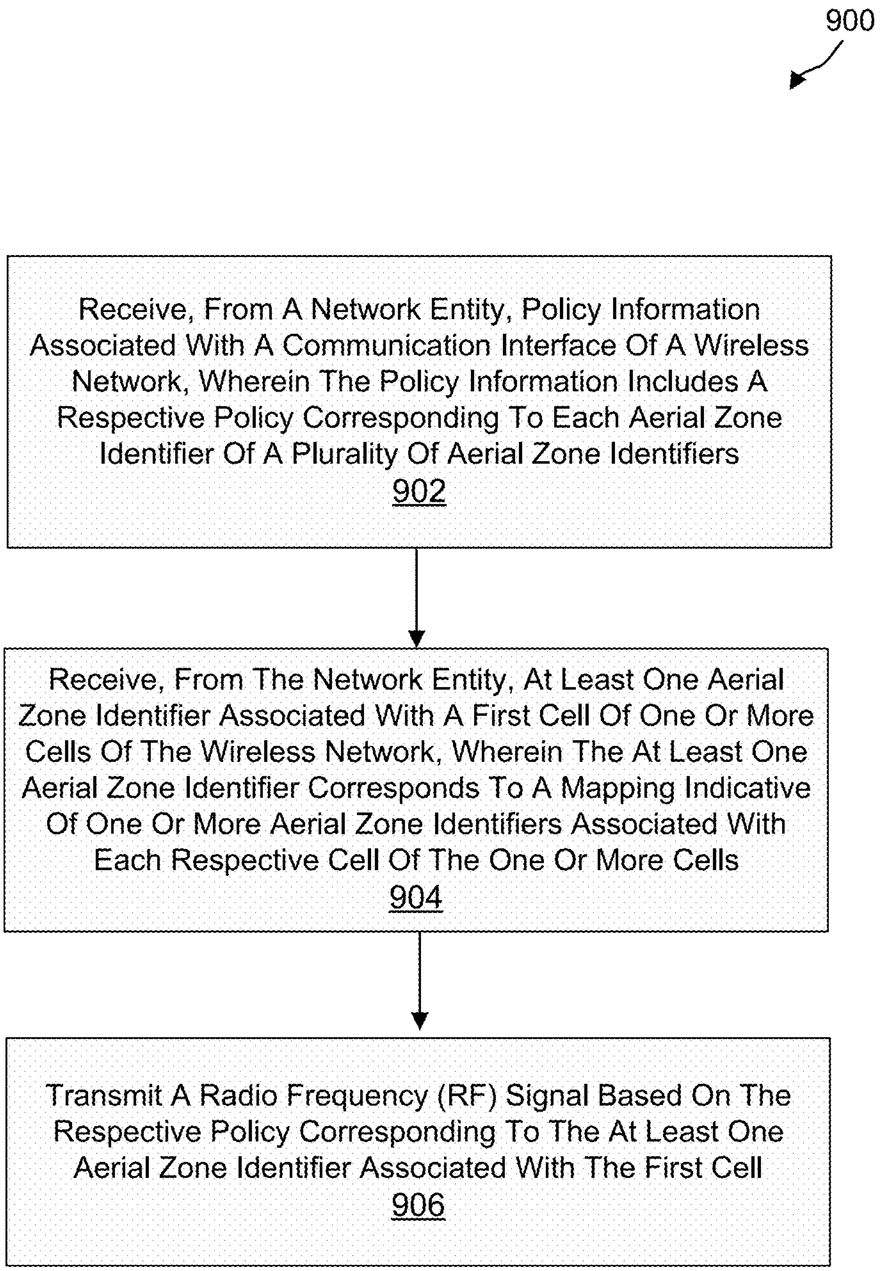
FIG. 9 is a flow diagram illustrating an example of a process for wireless communications performed at an aerial user equipment (UE), in accordance with some examples.

FIG. 9 is a flowchart diagram illustrating an example of a process 900 for performing wireless communications at an aerial user equipment (UE). The process 900 may be performed by an aerial UE or by a component or system (e.g., a chipset) of the aerial UE. The aerial UE may be an aircraft UE, an unmanned aerial vehicle (UAV), and unmanned aircraft system (UAS), among various others. In some cases, the aerial UE can be a UE that is the same as or similar to one or more of the UEs of any of FIG. 1, FIG. 2, FIG. 3, FIG. 4, etc. The operations of the process 900 may be implemented as software components that are executed and run on one or more processors (e.g., processor 1010 of FIG. 10 or other processor(s)). Further, the transmission and reception of signals by the wireless communications device in the process 900 may be enabled, for example, by one or more antennas and/or one or more transceivers (e.g., antenna(s) and/or wireless transceiver(s) of any of FIG. 2, FIG. 4, etc.).

At block 902, the process 900 includes receiving, from a network entity, policy information associated with a communication interface of a wireless network, wherein the policy information includes a respective policy corresponding to each aerial zone identifier of a plurality of aerial zone identifiers. For example, the wireless network can be a cellular network and the communication interface can be a PC5 interface or a sidelink communication interface. In some cases the policy information can include multiple different policies, where each policy is indicative of respective parameter values for configuring the aerial UE to communicate using the communication interface of the wireless network. For instance, a first respective policy can be indicative of one or more of a first transmission power or a first frequency corresponding to a first connectivity service associated with the communication interface. A second respective policy can be indicative of one or more of a second transmission power or a second frequency corresponding to a second connectivity service associated with the communication interface, wherein the first respective policy is different from the second respective policy, and wherein the first connectivity service is different from the second connectivity service. For instance, the first connectivity service can be a PC5 broadcast remote ID (BRID) message service and the second connectivity service can be a PC5 detect and avoid (DAA) message service (e.g., the first respective policy corresponds to a broadcast remote ID (BRID) message service of a PC5 interface and the second respective policy corresponds to a detect and avoid (DAA) message service of a PC5 interface). In some examples, the policy information includes a default policy corresponding to a subset of cells of a plurality of cells of the wireless network, wherein the subset of cells are not mapped to an aerial zone identifier. For instance, the default policy can correspond to the cells of the wireless network that are not mapped to the first aerial zone 610, the second aerial zone 620*a*, 620*b*, or the third aerial zone 630 of FIG. 6.

In some examples, each respective aerial zone identifier of the plurality of aerial zone identifiers is indicative of an aerial zone type. For example, a first aerial zone identifier can be indicative of an aerial zone type corresponding to first aerial zone 610 of FIG. 6, a second aerial zone identifier can be indicative of an aerial zone type corresponding to second aerial zones 620*a*, 620*b* of FIG. 6, and a third aerial zone identifier can be indicative of an aerial zone type corresponding to third aerial zone 630 of FIG. 6. In some cases, each respective aerial zone type is associated with a different policy for the communication interface of the wireless network. In some examples, each respective aerial zone type is associated with a respective policy for resources corresponding to the communication interface of the wireless network. Each respective policy can be indicative of usage parameters for the resources, such as a frequency or spectrum, a transmit power, a transmit frequency or periodicity, etc. In some cases, the usage parameters can correspond to a respective frequency range included in a spectrum associated with the resources and/or can correspond to a respective geographical region of a plurality of geographical regions associated with the resources.

At block 904, the process 900 includes receiving, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells. For instance, the plurality of aerial zones can include the first aerial zone 610, second aerial zones 620*a*, 620*b*, and third aerial zone 630 of FIG. 6. The one or more cells of the wireless network can be the same as or similar to the cells depicted in FIG. 6, including cells 612, 622*a*, 622*b*, and 630.

The aerial zone identifiers can be indicative of the first aerial zone 610, second aerial zones 620*a*, 620*b*, and/or third aerial zone 630 of FIG. 6. In some cases, the mapping can be based on configuration information associated with the plurality of aerial zones. The configuration information can be associated with an Unmanned Aircraft System Traffic Management (UTM) network entity, which may be the same as or similar to the UTM network entity 712 and/or the UTM AF 714 of FIG. 7.

The configuration information may be indicative of one or more aerial zone identifiers associated with each respective aerial zone of the plurality of aerial zones and location information associated with each respective aerial zone of the plurality of aerial zones. For instance, the location information can comprise a two-dimensional footprint of each respective aerial zone, such as the 2D footprint 520 corresponding to the 3D aerial zone 530 of FIG. 5B. The mapping can be indicative of a subset of cells of a plurality of cells of the wireless network that are located within a two-dimensional footprint of a particular aerial zone. One or more aerial zone identifiers associated with the particular aerial zone can be mapped to each cell of the subset of cells. For instance, the mapping can be indicative of the subset of cells 612 that are included within the 2D footprint of first aerial zone 610 of FIG. 6, the subset of cells 622*a* that are within the 2D footprint of second aerial zone 620*a* of FIG. 6, the subset of cells 622*b* that are within the 2D footprint of second aerial zone 620*b* of FIG. 6, and/or the subset of cells 632 that are within the 2D footprint of third aerial zone 630 of FIG. 6. In another example, the location information comprises a three-dimensional volume of each respective aerial zone. For instance, the location information can be indicative of the 3D volume 510 of FIG. 5*a*, the 3D volume 530 of FIG. 5B, the 3D volume 530*i* and/or 530*k* of FIG. 5C, etc. The mapping can be indicative of a subset of cells of a plurality of cells of the wireless network having a three-dimensional projection that intersects at least a portion of a three-dimensional volume of a particular aerial zone. One or more aerial zone identifiers associated with the particular aerial zone can be mapped to each cell of the subset of cells.

In some cases, the mapping for a particular aerial zone of the plurality of aerial zones can be indicative of a footprint of the particular aerial zone based on the location information. For instance, the footprint of the particular aerial zone can be mapped to one or more system information broadcast (SIB) areas of the wireless network. One or more aerial zone identifiers associated with the particular aerial zone can be mapped to each cell of one or more cells within the one or more SIB areas.

In some cases, the configuration information is indicative of one or more aerial zone identifiers associated with each respective aerial zone of the plurality of aerial zones and location information associated with each respective aerial zone of the plurality of aerial zones. The first cell can be located within a two-dimensional footprint of a particular aerial zone, the particular aerial zone corresponding to the at least one aerial zone identifier. In another example, the first cell is located within a three-dimensional volume of a particular aerial zone, the particular aerial zone corresponding to the at least one aerial zone identifier. In some examples, the first cell is included in a first system information broadcast (SIB) area of the wireless network, and the first SIB area is within a footprint of a particular aerial zone, the particular aerial zone corresponding to the at least one aerial zone identifier.

In some examples, the process 900 can include receiving, by the aerial UE at least one aerial zone identifier associated with a first cell of the one or more cells. The at least one aerial zone identifier can be associated with the first cell based on the mapping. For instance, the aerial UE can receive, from the network entity, a system information broadcast (SIB) message indicative of at least one aerial zone identifier for the first cell. In some cases, the SIB message can be received as a broadcast from RAN 732 of FIG. 7, for instance received from a gNB associated with a particular cell of RAN 732. The SIB message can be indicative of the one or more aerial zone identifiers corresponding to the particular cell of RAN 732 that is associated with the gNB. In another example, the aerial UE can receive, from the network entity, an RRCC message indicative of at least one aerial zone identifier for the first cell. In some cases, the RRC message can be received as a transmission from RAN 732 of FIG. 7, for instance by a gNB associated with a particular cell of RAN 732. The RRC message can be indicative of the one or more aerial zone identifiers corresponding to the particular cell of RAN 732 that is associated with the gNB.

At block 906, the process 900 includes transmitting a radio frequency (RF) signal based on the respective policy corresponding to the at least one aerial zone identifier associated with the first cell. For instance, the aerial UE can transmit an RF signal using one or more configuration parameters for the communication interface of the wireless network as indicated by the respective policy. In some cases, the aerial UE can transmit the RF signal using a PC5 or other sidelink interface. In some examples, the RF signal can be transmitted to any receiver or transceiver that is located within reception range of the RF signal transmitted by the aerial UE. In some examples, the RF signal can be transmitted to a second aerial UE. The second aerial UE may be located within the first cell (e.g., the first cell where the aerial UE is also located). The second aerial UE may be located outside of the first cell. In some examples, the RF signal can be transmitted to a ground receiver or other device or UE that includes a receiver or transceiver and is within receiving range of the RF signal transmitted by the aerial UE.

In some examples, the processes described herein (e.g., process 800, process 900, and/or other process described herein) may be performed by a computing device or apparatus (e.g., a UE, a network entity, etc.). In one example, the process 800 may be performed by a wireless communication device, such as a UE and/or aerial UE. In another example, the process 800 may be performed by a computing device with the computing system 1000 shown in FIG. 10. For instance, a wireless communication device with the computing architecture shown in FIG. 10 may include the components of the aerial UE and may implement the operations of FIG. 8. In one example, the process 900 may be performed by a network entity, such as a base station or other type of network entity. In another example, the process 900 may be performed by a computing device with the computing system 1000 shown in FIG. 10. For instance, a network entity with the computing architecture shown in FIG. 10 may include the components of the network entity and may implement the operations of FIG. 9.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The processes 800 and 900 are illustrated as logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the processes 800, 900, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
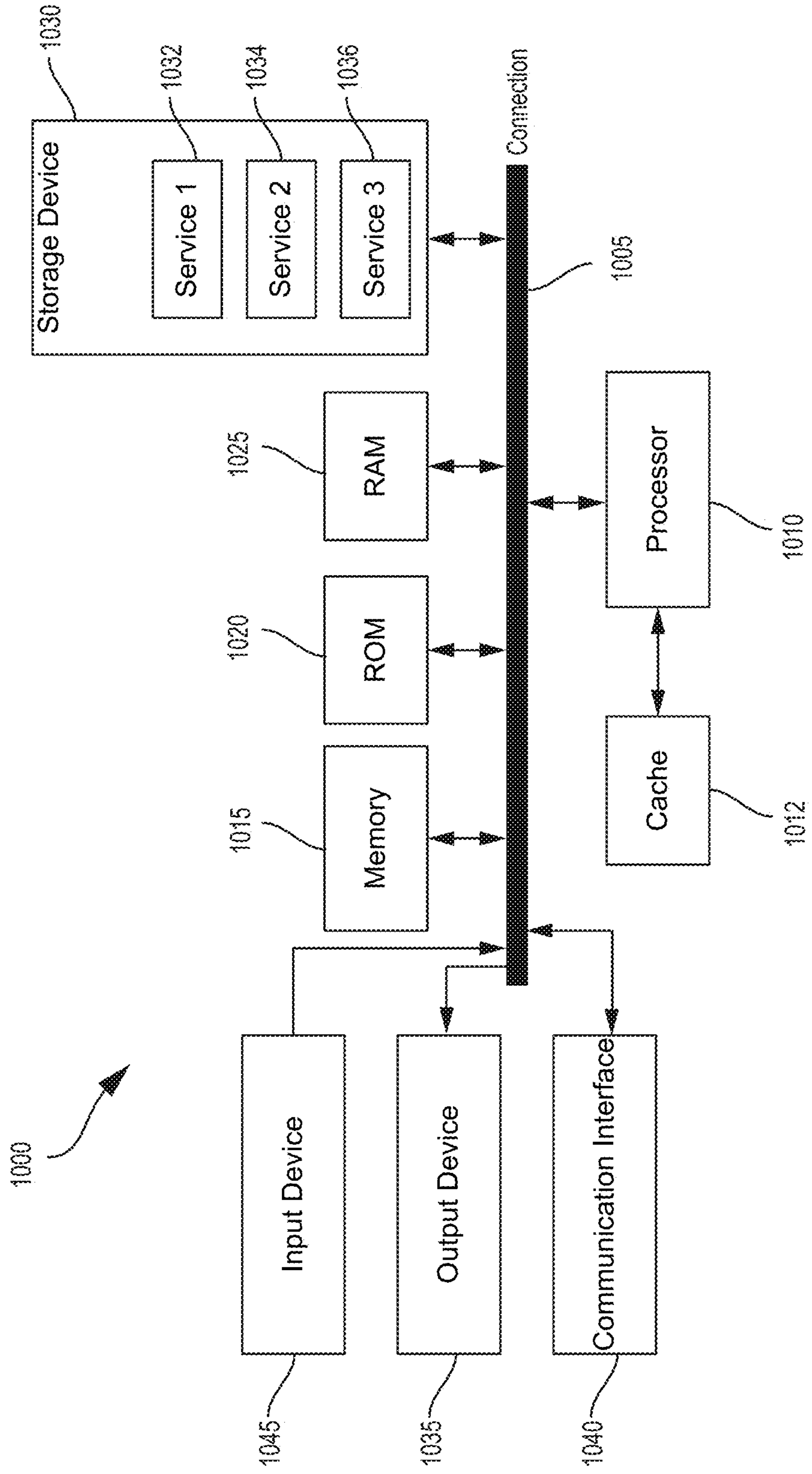
FIG. 10 is a block diagram illustrating an example of a computing system, in accordance with some examples.

FIG. 10 is a diagram illustrating an example of a system for implementing certain aspects of the present technology. In particular, FIG. 10 illustrates an example of computing system 1000, which may be for example any computing device making up internal computing system, a remote computing system, a camera, or any component thereof in which the components of the system are in communication with each other using connection 1005. Connection 1005 may be a physical connection using a bus, or a direct connection into processor 1010, such as in a chipset architecture. Connection 1005 may also be a virtual connection, networked connection, or logical connection.

In some aspects, computing system 1000 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1000 includes at least one processing unit (CPU or processor) 1010 and connection 1005 that communicatively couples various system components including system memory 1015, such as read-only memory (ROM) 1020 and random access memory (RAM) 1025 to processor 1010. Computing system 1000 may include a cache 1012 of high-speed memory connected directly with, in close proximity to, or integrated as part of processor 1010.

Processor 1010 may include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which may represent any number of input mechanisms, such as a microphone for speech, a touch-sensitive screen for gesture or graphical input, keyboard, mouse, motion input, speech, etc. Computing system 1000 may also include output device 1035, which may be one or more of a number of output mechanisms. In some instances, multimodal systems may enable a user to provide multiple types of input/output to communicate with computing system 1000.

Computing system 1000 may include communications interface 1040, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1030 may include software services, servers, services, etc., that when the code that defines such software is executed by the processor 1010, it causes the system to perform a function. In some aspects, a hardware service that performs a particular function may include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus of a network entity for wireless communications, comprising: at least one memory comprising instructions; and at least one processor configured to execute the instructions and cause the apparatus to: transmit, to an aerial user equipment (UE), policy information associated with a communication interface of a wireless network, wherein the policy information includes a respective policy corresponding to each aerial zone identifier of a plurality of aerial zone identifiers; determine a mapping of a plurality of aerial zones to one or more cells of the wireless network, wherein the mapping is indicative of one or more aerial zone identifiers associated with each respective cell of the one or more cells; and transmit, based on the mapping, at least one aerial zone identifier associated with a first cell of the one or more cells.

Aspect 2. The apparatus of Aspect 1, wherein, to transmit the at least one aerial zone identifier, the at least one processor is configured to: transmit a system information broadcast (SIB) message or a Radio Resource Control (RRC) message indicative of the at least one aerial zone identifier.

Aspect 3. The apparatus of any of Aspects 1 to 2, wherein each respective aerial zone identifier of the plurality of aerial zone identifiers is indicative of an aerial zone type.

Aspect 4. The apparatus of Aspect 3, wherein each respective aerial zone type is associated with a different policy for the communication interface of the wireless network.

Aspect 5. The apparatus of any of Aspects 3 to 4, wherein: each respective aerial zone type is associated with a respective policy for resources corresponding to the communication interface of the wireless network; each respective policy is indicative of usage parameters for the resources; and the usage parameters correspond to a respective frequency range included in a spectrum associated with the resources or to a respective geographical region of a plurality of geographical regions associated with the resources.

Aspect 6. The apparatus of any of Aspects 1 to 5, wherein the policy information includes: a first respective policy indicative of one or more of a first transmission power or a first frequency corresponding to a first connectivity service associated with the communication interface; and a second respective policy indicative of one or more of a second transmission power or a second frequency corresponding to a second connectivity service associated with the communication interface, wherein the first respective policy is different from the second respective policy, and wherein the first connectivity service is different from the second connectivity service.

Aspect 7. The apparatus of Aspect 6, wherein: the first respective policy corresponds to a broadcast remote ID (BRID) message service of a PC5 interface; and the second respective policy corresponds to a detect and avoid (DAA) message service of a PC5 interface.

Aspect 8. The apparatus of any of Aspects 1 to 7, wherein the wireless network is a cellular network, and wherein the communication interface is a PC5 interface or a sidelink communication interface.

Aspect 9. The apparatus of any of Aspects 1 to 8, wherein the policy information includes a default policy corresponding to a subset of cells of a plurality of cells of the wireless network, wherein the subset of cells are not mapped to an aerial zone identifier.

Aspect 10. The apparatus of any of Aspects 1 to 9, wherein the at least one processor is further configured to: receive configuration information associated with the plurality of aerial zones; and determine the mapping using the configuration information.

Aspect 11. The apparatus of Aspect 10, wherein the at least one processor is configured to receive the configuration information from an Unmanned Aircraft System Traffic Management (UTM) network entity.

Aspect 12. The apparatus of any of Aspects 10 to 11, wherein the configuration information is indicative of: one or more aerial zone identifiers associated with each respective aerial zone of the plurality of aerial zones; and location information associated with each respective aerial zone of the plurality of aerial zones.

Aspect 13. The apparatus of Aspect 12, wherein the location information comprises a two-dimensional footprint of each respective aerial zone and, to determine the mapping, the at least one processor is configured to: determine a subset of cells of a plurality of cells of the wireless network that are located within a two-dimensional footprint of a particular aerial zone; and map one or more aerial zone identifiers associated with the particular aerial zone to each cell of the subset of cells.

Aspect 14. The apparatus of any of Aspects 12 to 13, wherein the location information comprises a three-dimensional volume of each respective aerial zone and, to determine the mapping, the at least one processor is configured to: determine a subset of cells of a plurality of cells of the wireless network having a three-dimensional projection that intersects at least a portion of a three-dimensional volume of a particular aerial zone; and map one or more aerial zone identifiers associated with the particular aerial zone to each cell of the subset of cells.

Aspect 15. The apparatus of any of Aspects 12 to 14, wherein, to determine the mapping for a particular aerial zone of the plurality of aerial zones, the at least one processor is configured to: determine a footprint of the particular aerial zone based on the location information; map the footprint of the particular aerial zone to one or more system information broadcast (SIB) areas of the wireless network; and map one or more aerial zone identifiers associated with the particular aerial zone to each cell of one or more cells within the one or more SIB areas.

Aspect 16. An apparatus of an aerial user equipment (UE) for wireless communications, comprising: at least one memory; and at least one processor coupled to the at least one memory and configured to: receive, from a network entity, policy information associated with a communication interface of a wireless network, wherein the policy information includes a respective policy corresponding to each aerial zone identifier of a plurality of aerial zone identifiers; receive, from the network entity, at least one aerial zone identifier associated with a first cell of one or more cells of the wireless network, wherein the at least one aerial zone identifier corresponds to a mapping indicative of one or more aerial zone identifiers associated with each respective cell of the one or more cells; and transmit a radio frequency (RF) signal based on the respective policy corresponding to the at least one aerial zone identifier associated with the first cell.

Aspect 17. The apparatus of Aspect 16, wherein, to receive the at least one aerial zone identifier, the at least one processor is configured to: receive a system information broadcast (SIB) message or a Radio Resource Control (RRC) message indicative of the at least one aerial zone identifier.

Aspect 18. The apparatus of any of Aspects 16 to 17, wherein each respective aerial zone identifier of the plurality of aerial zone identifiers is indicative of an aerial zone type.

Aspect 19. The apparatus of Aspect 18, wherein each respective aerial zone type is associated with a different policy for the communication interface of the wireless network.

Aspect 20. The apparatus of any of Aspects 18 to 19, wherein: each respective aerial zone type is associated with a respective policy for resources corresponding to the communication interface of the wireless network; each respective policy is indicative of usage parameters for the resources; and the usage parameters correspond to a respective frequency range included in a spectrum associated with the resources or to a respective geographical region of a plurality of geographical regions associated with the resources.

Aspect 21. The apparatus of any of Aspects 16 to 20, wherein the policy information includes: a first respective policy indicative of one or more of a first transmission power or a first frequency corresponding to a first connectivity service associated with the communication interface; and a second respective policy indicative of one or more of a second transmission power or a second frequency corresponding to a second connectivity service associated with the communication interface, wherein the first respective policy is different from the second respective policy, and wherein the first connectivity service is different from the second connectivity service.

Aspect 22. The apparatus of Aspect 21, wherein: the first respective policy corresponds to a broadcast remote ID (BRID) message service of a PC5 interface; and the second respective policy corresponds to a detect and avoid (DAA) message service of a PC5 interface.

Aspect 23. The apparatus of any of Aspects 16 to 22, wherein the wireless network is a cellular network, and wherein the communication interface is a PC5 interface or a sidelink communication interface.

Aspect 24. The apparatus of any of Aspects 16 to 23, wherein the policy information includes a default policy corresponding to a subset of cells of a plurality of cells of the wireless network, wherein the subset of cells are not mapped to an aerial zone identifier.

Aspect 25. The apparatus of any of Aspects 16 to 24, wherein the mapping is based on configuration information associated with the plurality of aerial zones.

Aspect 26. The apparatus of Aspect 25, wherein the configuration information is associated with an Unmanned Aircraft System Traffic Management (UTM) network entity.

Aspect 27. The apparatus of any of Aspects 25 to 26, wherein the configuration information is indicative of: one or more aerial zone identifiers associated with each respective aerial zone of the plurality of aerial zones; and location information associated with each respective aerial zone of the plurality of aerial zones.

Aspect 28. The apparatus of any of Aspects 16 to 27, wherein the first cell is located within a two-dimensional footprint of a particular aerial zone, the particular aerial zone corresponding to the at least one aerial zone identifier.

Aspect 29. The apparatus of any of Aspects 16 to 28, wherein the first cell is located within a three-dimensional volume of a particular aerial zone, the particular aerial zone corresponding to the at least one aerial zone identifier.

Aspect 30. The apparatus of any of Aspects 16 to 29, wherein the first cell is included in a first system information broadcast (SIB) area of the wireless network, and wherein the first SIB area is within a footprint of a particular aerial zone, the particular aerial zone corresponding to the at least one aerial zone identifier.

Aspect 31. A method comprising operations according to any of Aspects 1 to 15.

Aspect 32. A computer-readable medium storing instructions that, when executed by one or more processors, cause the one or more processors to perform operations according to any of Aspects 1 to 15.

Aspect 33. An apparatus for wireless communications, comprising one or more means for performing operations according to any of Aspects 1 to 15.

Aspect 34. A method comprising operations according to any of Aspects 16 to 30.

Aspect 35. A computer-readable medium storing instructions that, when executed by one or more processors, cause the one or more processors to perform operations according to any of Aspects 16 to 30.

Aspect 36. An apparatus for wireless communications, comprising one or more means for performing operations according to any of Aspects 16 to 30.

What is claimed is:

1. An apparatus of a network entity for wireless communications, comprising:

at least one memory comprising instructions; and at least one processor configured to execute the instructions and cause the apparatus to:

transmit, to an aerial user equipment (UE), policy information associated with usage of resources of a communication interface of a wireless network, wherein the policy information includes a respective policy indicative of corresponding usage parameters for the usage of the resources by the aerial UE for each aerial zone identifier of a plurality of aerial zone identifiers;

determine a mapping of a plurality of aerial zones to one or more cells of the wireless network, wherein each aerial zone of the plurality of aerial zones is associated with a corresponding aerial zone identifier included in the plurality of aerial zone identifiers and a type of aerial zone indicated by the corresponding aerial zone identifier, wherein different types of aerial zones correspond to different respective policies for communications performed by the aerial UE within each different type of aerial zone, and wherein the mapping is indicative of one or more aerial zone identifiers associated with each respective cell of the one or more cells; and transmit, based on the mapping, at least one aerial zone identifier associated with a first cell of the one or more cells.

2. The apparatus of claim 1, wherein, to transmit the at least one aerial zone identifier, the at least one processor is configured to:

transmit a system information broadcast (SIB) message or a Radio Resource Control (RRC) message indicative of the at least one aerial zone identifier.

3. The apparatus of claim 1, wherein each respective aerial zone identifier of the plurality of aerial zone identifiers is indicative of an aerial zone type.

4. The apparatus of claim 3, wherein each respective aerial zone type is associated with a different policy for the communication interface of the wireless network.

5. The apparatus of claim 3, wherein:

each respective aerial zone type is associated with a respective policy for resources corresponding to the communication interface of the wireless network;

each respective policy is indicative of usage parameters for the resources; and the usage parameters correspond to a respective frequency range included in a spectrum associated with the resources or to a respective geographical region of a plurality of geographical regions associated with the resources.

6. The apparatus of claim 1, wherein the policy information includes:

a first respective policy indicative of one or more of a first transmission power or a first frequency corresponding to a first connectivity service associated with the communication interface; and a second respective policy indicative of one or more of a second transmission power or a second frequency corresponding to a second connectivity service associated with the communication interface, wherein the first respective policy is different from the second respective policy, and wherein the first connectivity service is different from the second connectivity service.

7. The apparatus of claim 6, wherein:

the first respective policy corresponds to a broadcast remote ID (BRID) message service of a PC5 interface; and the second respective policy corresponds to a detect and avoid (DAA) message service of a PC5 interface.

8. The apparatus of claim 1, wherein the wireless network is a cellular network, and wherein the communication interface is a PC5 interface or a sidelink communication interface.

9. The apparatus of claim 1, wherein the policy information includes a default policy corresponding to a subset of cells of a plurality of cells of the wireless network, wherein the subset of cells are not mapped to an aerial zone identifier.

10. The apparatus of claim 1, wherein the at least one processor is further configured to:

receive configuration information associated with the plurality of aerial zones; and determine the mapping using the configuration information.

11. The apparatus of claim 10, wherein the at least one processor is configured to receive the configuration information from an Unmanned Aircraft System Traffic Management (UTM) network entity.

12. The apparatus of claim 10, wherein the configuration information is indicative of:

one or more aerial zone identifiers associated with each respective aerial zone of the plurality of aerial zones; and location information associated with each respective aerial zone of the plurality of aerial zones.

13. The apparatus of claim 12, wherein the location information comprises a two-dimensional footprint of each respective aerial zone and, to determine the mapping, the at least one processor is configured to:

determine a subset of cells of a plurality of cells of the wireless network that are located within a two-dimensional footprint of a particular aerial zone; and map one or more aerial zone identifiers associated with the particular aerial zone to each cell of the subset of cells.

14. The apparatus of claim 12, wherein the location information comprises a three-dimensional volume of each respective aerial zone and, to determine the mapping, the at least one processor is configured to:

determine a subset of cells of a plurality of cells of the wireless network having a three-dimensional projection that intersects at least a portion of a three-dimensional volume of a particular aerial zone; and map one or more aerial zone identifiers associated with the particular aerial zone to each cell of the subset of cells.

15. The apparatus of claim 12, wherein, to determine the mapping for a particular aerial zone of the plurality of aerial zones, the at least one processor is configured to:

determine a footprint of the particular aerial zone based on the location information;

map the footprint of the particular aerial zone to one or more system information broadcast (SIB) areas of the wireless network; and map one or more aerial zone identifiers associated with the particular aerial zone to each cell of one or more cells within the one or more SIB areas.

16. An apparatus of an aerial user equipment (UE) for wireless communications, comprising:

at least one memory; and at least one processor coupled to the at least one memory and configured to:

receive, from a network entity, policy information associated with usage of resources of a communication interface of a wireless network, wherein the policy information includes a respective policy indicative of corresponding usage parameters for the usage of the resources by the aerial UE for each aerial zone identifier of a plurality of aerial zone identifiers;

receive, from the network entity, at least one aerial zone identifier associated with a first cell of one or more cells of the wireless network, wherein the at least one aerial zone identifier corresponds to a mapping of a plurality of aerial zones to the one or more cells, wherein each aerial zone of the plurality of aerial zones is associated with a corresponding aerial zone identifier included in the plurality of aerial zone identifiers and a type of aerial zone indicated by the corresponding aerial zone identifier, wherein different types of aerial zones correspond to different respective policies for communications performed by the aerial UE within each different type of aerial zone, and wherein the mapping is indicative of one or more aerial zone identifiers associated with each respective cell of the one or more cells; and transmit a radio frequency (RF) signal based on the respective policy corresponding to the at least one aerial zone identifier associated with the first cell.

17. The apparatus of claim 16, wherein, to receive the at least one aerial zone identifier, the at least one processor is configured to:

receive a system information broadcast (SIB) message or a Radio Resource Control (RRC) message indicative of the at least one aerial zone identifier.

18. The apparatus of claim 16, wherein each respective aerial zone identifier of the plurality of aerial zone identifiers is indicative of an aerial zone type.

19. The apparatus of claim 18, wherein each respective aerial zone type is associated with a different policy for the communication interface of the wireless network.

20. The apparatus of claim 18, wherein:

each respective aerial zone type is associated with a respective policy for resources corresponding to the communication interface of the wireless network;

each respective policy is indicative of usage parameters for the resources; and the usage parameters correspond to a respective frequency range included in a spectrum associated with the resources or to a respective geographical region of a plurality of geographical regions associated with the resources.

21. The apparatus of claim 16, wherein the policy information includes:

a first respective policy indicative of one or more of a first transmission power or a first frequency corresponding to a first connectivity service associated with the communication interface; and a second respective policy indicative of one or more of a second transmission power or a second frequency corresponding to a second connectivity service associated with the communication interface, wherein the first respective policy is different from the second respective policy, and wherein the first connectivity service is different from the second connectivity service.

22. The apparatus of claim 21, wherein:

the first respective policy corresponds to a broadcast remote ID (BRID) message service of a PC5 interface; and the second respective policy corresponds to a detect and avoid (DAA) message service of a PC5 interface.

23. The apparatus of claim 16, wherein the wireless network is a cellular network, and wherein the communication interface is a PC5 interface or a sidelink communication interface.

24. The apparatus of claim 16, wherein the policy information includes a default policy corresponding to a subset of cells of a plurality of cells of the wireless network, wherein the subset of cells are not mapped to an aerial zone identifier.

25. The apparatus of claim 16, wherein the mapping is based on configuration information associated with the plurality of aerial zones.

26. The apparatus of claim 25, wherein the configuration information is associated with an Unmanned Aircraft System Traffic Management (UTM) network entity.

27. The apparatus of claim 25, wherein the configuration information is indicative of:

one or more aerial zone identifiers associated with each respective aerial zone of the plurality of aerial zones; and location information associated with each respective aerial zone of the plurality of aerial zones.

28. The apparatus of claim 16, wherein the first cell is located within a two-dimensional footprint of a particular aerial zone, the particular aerial zone corresponding to the at least one aerial zone identifier.

29. The apparatus of claim 16, wherein the first cell is located within a three-dimensional volume of a particular aerial zone, the particular aerial zone corresponding to the at least one aerial zone identifier.

30. The apparatus of claim 16, wherein the first cell is included in a first system information broadcast (SIB) area of the wireless network, and wherein the first SIB area is within a footprint of a particular aerial zone, the particular aerial zone corresponding to the at least one aerial zone identifier.

* * * * *